(12) United States Patent
Khandani et al.

(10) Patent No.: US 10,389,447 B1
(45) Date of Patent: Aug. 20, 2019

(54) DIMENSIONAL TRANSFORMATION

(71) Applicants: Amir Khandani, Kitchener (CA); Shahab Oveis Gharan, Nepean (CA); Michael Andrew Reimer, Stittsville (CA); Maurice O'Sullivan, Ottawa (CA); Kim B. Roberts, Ottawa (CA)

(72) Inventors: Amir Khandani, Kitchener (CA); Shahab Oveis Gharan, Nepean (CA); Michael Andrew Reimer, Stittsville (CA); Maurice O'Sullivan, Ottawa (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/003,736

(22) Filed: Jun. 8, 2018

(51) Int. Cl.
| | |
|---|---|
| H04L 1/00 | (2006.01) |
| H04L 1/20 | (2006.01) |
| H04B 10/60 | (2013.01) |
| H04L 25/03 | (2006.01) |
| H04B 10/2543 | (2013.01) |

(Continued)

(52) U.S. Cl.
CPC ... *H04B 10/2543* (2013.01); *H04L 25/03006* (2013.01); *H04B 10/40* (2013.01); *H04B 10/50* (2013.01); *H04B 10/60* (2013.01); *H04L 1/0041* (2013.01); *H04L 1/203* (2013.01); *H04L 2025/03636* (2013.01)

(58) Field of Classification Search
None
See application file for complete search history.

(56) References Cited

U.S. PATENT DOCUMENTS

| | | |
|---|---|---|
| 3,388,330 A | 6/1968 | Kretzmer et al. |
| 7,305,183 B2 | 12/2007 | Roberts et al. |
| 7,382,985 B2 | 6/2008 | Roberts et al. |

(Continued)

OTHER PUBLICATIONS

Liu, "Twin-Wave-Based Optical Transmission with Enhanced Linear and Nonlinear Performances," Journal of Lightwave Technology, vol. 33, Issue 5, pp. 1037-1043, Mar. 1, 2015.

(Continued)

*Primary Examiner* — Darren E Wolf
(74) *Attorney, Agent, or Firm* — Integral Intellectual Property Inc.; Amy Scouten; Miriam Paton

(57) ABSTRACT

A receiver may receive an optical signal over an optical communications channel established between the receiver and a transmitter, the received optical signal comprising a degraded version of a modulated optical signal generated at the transmitter. The receiver may determine received digital signals corresponding to a plurality of first dimensions of the received optical signal, wherein the first dimensions correspond to dimensions of an optical carrier modulated at the transmitter to represent a multi-bit symbol, and wherein the first dimensions are distributed over two or more timeslots. The receiver may determine preliminary digital drive signal estimates using an inverse dimensional transformation and the received digital signals, the preliminary digital drive signal estimates corresponding to a plurality of second dimensions. The receiver may determine an estimate of the multi-bit symbol using the preliminary digital drive signal estimates. The inverse dimensional transformation may average signal degradations in the received digital signals.

20 Claims, 10 Drawing Sheets

(51) Int. Cl.
*H04B 10/40* (2013.01)
*H04B 10/50* (2013.01)

(56) References Cited

U.S. PATENT DOCUMENTS

| | | | | |
|---|---|---|---|---|
| 7,532,822 | B2 | 5/2009 | Sun et al. | |
| 7,936,999 | B1 | 5/2011 | Hawryluck et al. | |
| 8,385,747 | B2 | 2/2013 | Roberts et al. | |
| 8,718,491 | B2 | 5/2014 | Khandani et al. | |
| 8,761,600 | B2 * | 6/2014 | Kim | H04B 10/532 398/30 |
| 9,602,207 | B2 | 3/2017 | Khandani et al. | |
| 2012/0057863 | A1 * | 3/2012 | Winzer | H04B 10/60 398/3 |
| 2013/0230312 | A1 * | 9/2013 | Randel | H04B 10/611 398/25 |
| 2015/0229401 | A1 * | 8/2015 | Tanaka | H04L 7/0075 398/135 |
| 2015/0372764 | A1 * | 12/2015 | Kaneda | H04B 10/616 398/115 |

OTHER PUBLICATIONS

Meron, et al., "Use of space-time coding in coherent polarization-multiplexed systems suffering from polarization-dependent loss," Opt. Lett. 35(21), 3547-3549 (2010), Nov. 1, 2010.

Mumtaz, et al., "PDL Mitigation in PolMux OFDM Systems Using Golden and Silver Polarization-Time Codes," Optical Fiber Communication Conference, OSA Technical Digest (CD) (Optical Society of America, 2010), paper JThA7, Mar. 21, 2010.

Mumtaz, et al., "Space-Time codes for optical fiber communication with polarization multiplexing," IEEE International Conference on Communications (IEEE, 2010), pp. 1-5, May 23, 2010.

Shibahara, et al., "Filtering-tolerant transmission by the Walsh-Hadamard transform for super-channel beyond 100 Gb/s", Optical Society of America, vol. 23, No. 10, 12 May 12, 2015.

Viterbi, et al., "A Pragmatic Approach to Trellis-Coded Modulation", IEEE Communications Magazine, vol. 27, Issue 7, pp. 11-19, Jul. 1, 1989.

\* cited by examiner

DIMENSIONAL TRANSFORMATION

TECHNICAL FIELD

This document relates to the technical field of optical communications.

BACKGROUND

In an optical communications system, a transmitter may encode client data bits by mapping them to multi-bit symbols, and then using a particular modulation scheme to modulate one or more optical carriers with the symbols, thereby generating an optical signal to be transmitted via a communications channel to a receiver, where the optical signal is representative of digital information. The receiver may process an optical signal received via the communications channel to recover estimates of the multi-bit symbols, the client data bits, or both.

The optical signal received at the receiver may comprise a degraded version of the optical signal that was generated at the transmitter. Various components of the optical communications system may contribute to signal degradation, including optical fibers, optical amplifiers, filters, isolators, and the like. Effects such as amplifier noise, optical nonlinearity, polarization dependent loss or gain (PDL), and polarization mode dispersion (PMD) may introduce noise and/or distortion into the signal. The amplitude of the noise relative to the amplitude of the optical signal may be characterized by the signal-to-noise ratio (SNR), or alternatively by the noise-to-signal ratio (NSR). The NSR may be convenient when dissecting noise sources. A high NSR may result in noisy symbol estimates, which may in turn produce erroneous estimates of the client data bits. The probability that client data bit estimates recovered at the receiver will differ from the original client data bits encoded at the transmitter may be characterized by the Bit Error Ratio or Bit Error Rate (BER). A given application may have a maximum BER tolerance. For example, an application may require that the BER not exceed 1016.

Forward Error Correction (FEC) techniques may be used to reduce the BER. Instead of the transmitter mapping the original client data bits directly to multi-bit symbols, the client data bits may first undergo FEC encoding based on a chosen FEC scheme. The resulting FEC-encoded bits include redundant information, such as parity or check bits. The bit estimates recovered at the receiver will be estimates of the FEC-encoded bits that were generated the transmitter. These estimates may undergo FEC decoding at the receiver based on the chosen FEC scheme. The FEC decoding makes use of the redundant information that was included in the FEC-encoded bits in order to detect and correct bit errors.

FEC encoding is advantageous in that it may permit error control without the need to resend data packets. However, this is at the cost of increased overhead. The amount of overhead or redundancy added by FEC encoding may be characterized by the information rate R, where R is defined as the ratio of the amount of input information to the amount of data that is output after FEC encoding (which includes the overhead). For example, if FEC encoding adds 25% overhead, then for every four information bits that are to be FEC-encoded, the FEC encoding will add 1 bit of overhead, resulting in 5 FEC-encoded data bits to be transmitted to the receiver. This corresponds to an information rate R=4/5=0.8.

SUMMARY

According to a broad aspect, an optical receiver is operative to receive an optical signal over an optical communications channel established between the optical receiver and an optical transmitter, wherein the received optical signal comprises a degraded version of a modulated optical signal generated at the optical transmitter. The optical receiver is operative to determine received digital signals corresponding to a plurality of first dimensions of the received optical signal, wherein the first dimensions correspond to dimensions of an optical carrier modulated at the optical transmitter to represent a multi-bit symbol, and wherein the first dimensions are distributed over two or more timeslots. The optical receiver is operative to determine preliminary digital drive signal estimates using an inverse dimensional transformation and the received digital signals, the preliminary digital drive signal estimates corresponding to a plurality of second dimensions. The optical receiver is operative to determine an estimate of the multi-bit symbol using the preliminary digital drive signal estimates.

According to some examples, the plurality of second dimensions is less than the plurality of first dimensions.

According to some examples, the two or more timeslots may be consecutive or non-consecutive.

According to some examples, the plurality of first dimensions is distributed over two polarizations.

According to some examples, the plurality of first dimensions is distributed over in-phase (I) and quadrature (Q) components of at least one polarization.

According to some examples, the inverse dimensional transformation averages signal degradations in the received digital signals, the signal degradations caused by one or more of noise, nonlinear effects, polarization dependent loss or gain (PDL), and analog imperfections.

According to some examples, the inverse dimensional transformation comprises a matrix, wherein the matrix is substantially linear and substantially unitary.

According to some examples, the first dimensions of the optical carrier are modulated at the optical transmitter based on transformed digital drive signals, the transformed digital drive signals having been determined at the optical transmitter using a dimensional transformation and preliminary digital drive signals.

According to some examples, the dimensional transformation comprises a first matrix, wherein the inverse dimensional transformation comprises a second matrix, wherein the first and second matrices are substantially linear and substantially unitary, and wherein the second matrix is substantially the inverse of the first matrix.

According to some examples, the received optical signal is processed using an adaptive equalization circuit to compensate for linear impairments in the optical communications channel.

DETAILED DESCRIPTION

Figure 1:
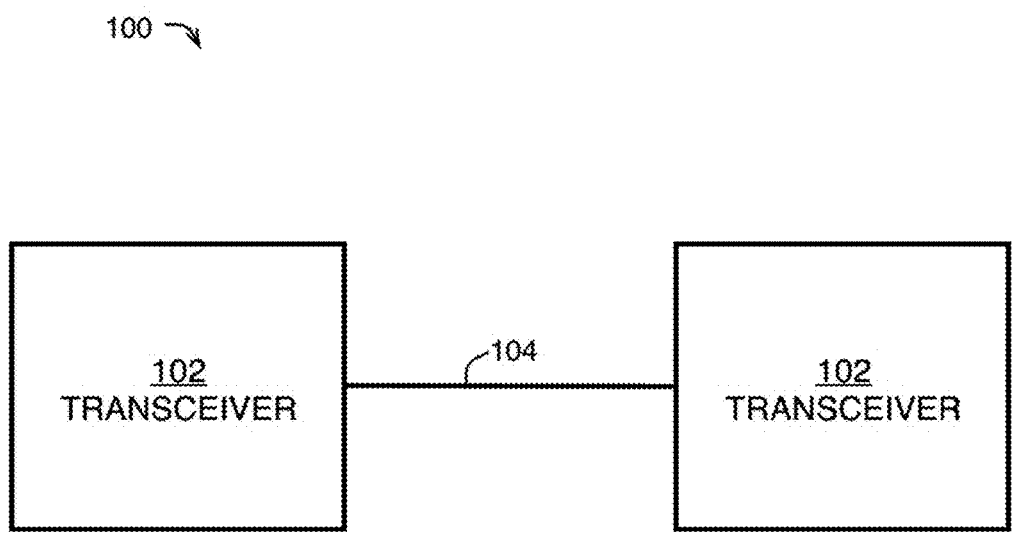
FIG. 1 illustrates an example optical communications system in accordance with the technology disclosed herein.

FIG. 1 illustrates an optical communication system 100 in accordance with the technology disclosed herein. The communications system 100 comprises transceivers 102. An optical signal, representative of digital information (also referred to as client data), is transmitted between the transceivers 102 via an optical communications channel 104. The transceivers 102 may be flexible, such that various configuration parameters of the transceivers 102 can be adjusted. For the optical communication system 100 to be operable, the configuration parameters of a transmitter section of one of the transceivers 102 must be compatible with the configuration parameters of a receiver section of the other of the transceivers 102. Examples of configuration parameters include a modulation format or scheme, symbol rate, forward error correction (FEC) parameters, digital signal processing (DSP) parameters, pulse shaping parameters, the number of sub-carriers for frequency division multiplexing (FDM), chromatic dispersion compensation parameters, carrier phase recovery parameters, and digital nonlinear compensation parameters.

For the purposes of the present disclosure, it is convenient to consider a transmitted optical signal, such as the signal transmitted via the optical communications channel 104, as a function of four orthogonal dimensions versus time. The four orthogonal dimensions comprise the respective in-phase (I) and quadrature (Q) components of each of two orthogonal polarizations, denoted generically as X and Y. For simplicity, the polarizations at the transmitter, which are linear, may be denoted as $X_{Tx}$ and $Y_{Tx}$, respectively. These orthogonal polarizations rotate along the optical path from the transmitter to the receiver, and are generally elliptical in shape. For notation purposes, the four dimensions at a particular timeslot, t, may be denoted as XI(t), XQ(t), YI(t), and YQ(t). At a different timeslot, t+T, the four dimensions of the optical signal may be denoted as XI(t+T), XQ(t+T), YI(t+T), and YQ(t+T). When the dimensions of the optical signal at the two different timeslots, t and t+T, are combined, the total number of dimensions resulting from the combination would be eight, and these dimensions would be denoted as: XI(t), XQ(t), YI(t), YQ(t), XI(t+T), XQ(t+T), YI(t+T), and YQ(t+T).

A signal transmitted via the optical communications channel 104 may be altered by various elements of the optical communications system, such as optical fibers, optical amplifiers, filters, isolators, wavelength-selective switches, and the like. For example, the passage of a signal through an optical fiber or an optical filter may attenuate the optical signal, whereas the passage of the signal through an optical amplifier may strengthen the signal. The signal loss (or signal gain) caused by a given component may depend on the polarization state of the signal. In general, this effect is referred to as polarization dependent loss or gain (denoted PDL). Where two channels of information are transmitted on the same carrier frequency using waves of two orthogonal polarization states, denoted as $X_{PDL}$ and $Y_{PDL}$, a given element of the system may cause each channel to experience a different level of PDL. PDL is cumulative across all elements in the optical communications system. As a result of PDL, one polarization may be noisier than another polarization.

Random imperfections in an optical fiber may cause two orthogonal polarizations to propagate with different speeds. This effect, referred to as polarization mode dispersion (PMD), causes the two polarization components of a signal, denoted as $X_{PMD}$ and $Y_{PMD}$, to slowly separate over the length of an optical fiber, thereby causing pulses to broaden and overlap. The PMD of a signal may be characterized by a number, M, of timeslots over which the overlapping occurs. M may also be referred to as the PMD "memory". PMD compensation may be achieved using an adaptive filter at the receiver, such as a least means squares (LMS) circuit. However, an LMS circuit may add a correlation between noise components of the symbols at different times. This noise correlation may be observed in the same M timeslots in which PMD memory is observed.

Measurement and mitigation techniques for PDL and/or PMD are described, for example, in U.S. Pat. No. 7,305,183 to Roberts et al.; U.S. Pat. No. 7,382,985 to Roberts et al.; U.S. Pat. No. 7,532,822 to Sun et al.; U.S. Pat. No. 7,936,999 to Hawryluck et al.; U.S. Pat. No. 8,385,747 to Roberts et al.; U.S. Pat. No. 8,718,491 to Khandani et al.; U.S. Pat. No. 9,602,207 to Khandani et al.; and in the following publications: Mumtaz et al. "PDL Mitigation in PolMux OFDM Systems Using Golden and Silver Polarization-Time Codes," *Optical Fiber Communication Conference*, OSA Technical Digest (CD) (Optical Society of America, 2010), paper JThA7; Mumtaz et al. "Space-Time codes for optical fiber communication with polarization multiplexing," *IEEE International Conference on Communications* (IEEE, 2010), pp. 1-5; and Meron et al. "Use of space-time coding in coherent polarization-multiplexed systems suffering from polarization-dependent loss," *Opt. Lett.* 35(21), 3547-3549 (2010), each of which is incorporated by reference herein.

U.S. Pat. Nos. 8,718,491 and 9,602,207 describe the application of a noise whitening matrix to both reduce the total noise and to make the noise variances equal between orthogonal polarizations. The noise whitening matrix is only applied at the receiver, and may be dynamically updated in response to any changes in the optical line. A transmit Jones rotation matrix may be applied at the transmitter, in which the rotation angles attempt to track the changes the optical line such that the received orientation is optimum relative to the PDL of the noise.

The publications by Mumtaz et al. and Meron et al. describe gold and silver space-time codes which may be used to mitigate the effects of PDL. The implementation of gold and silver codes generally requires intricate decoding circuits.

Figure 2:
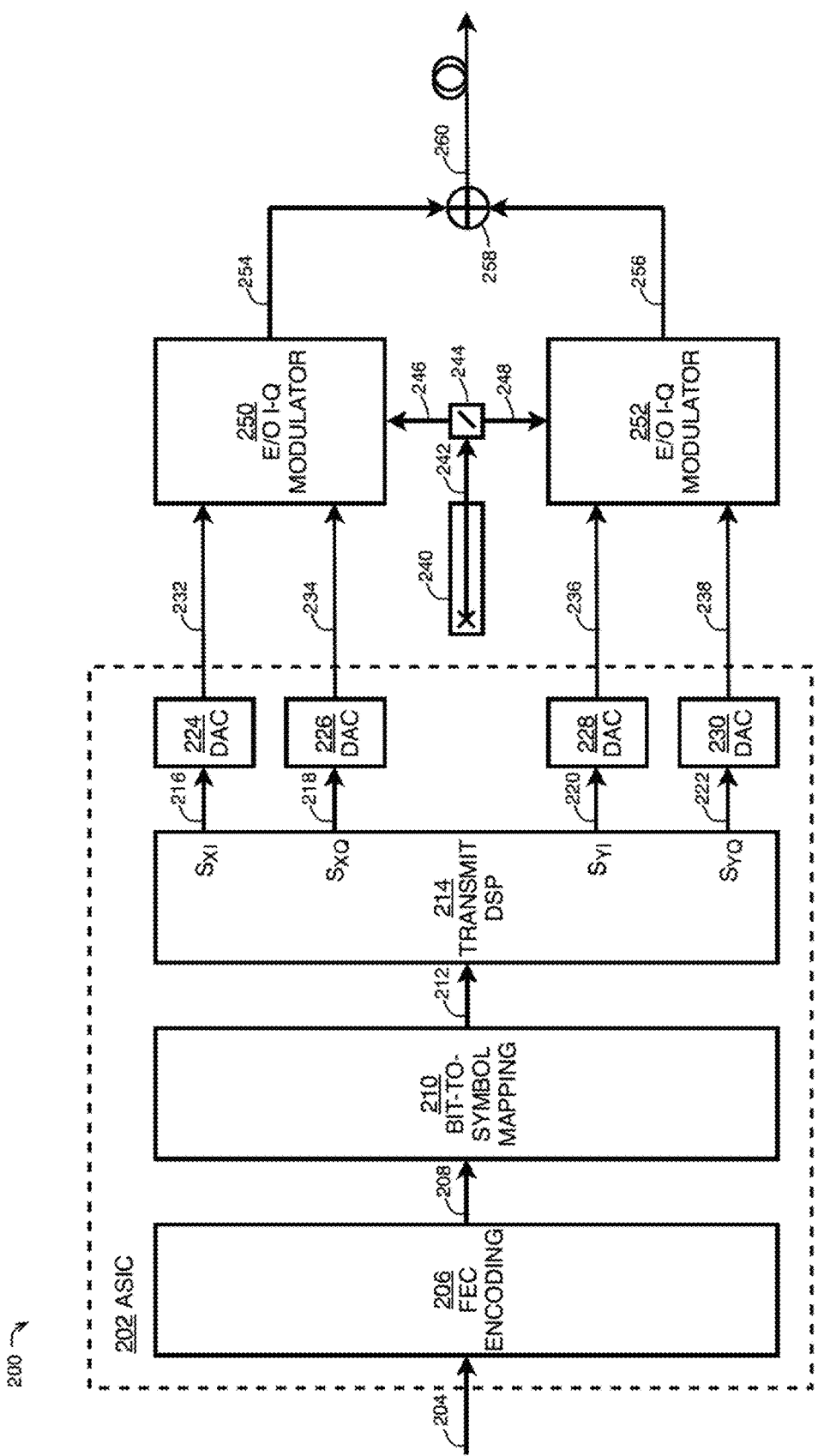
FIG. 2 illustrates an example transmitter in accordance with the technology disclosed herein.

FIG. 2 is a block diagram illustration of an example transmitter section 200 of a transceiver ("transmitter 200"), in accordance with examples of the technology disclosed herein.

The transmitter 200 is operative to transmit an optical signal 260 which is representative of client data bits 204. The transmitter 200 employs polarization-division multiplexing (PDM). In other examples (not shown), generation of the optical signal may involve alternative techniques, such as single polarization modulation, modulation of an unpolarized carrier, mode-division multiplexing, spatial-division multiplexing, Stokes-space modulation, polarization balanced modulation, and the like. A laser 240 is operative to generate a continuous wave (CW) optical carrier 242. A polarizing beam splitter 244 is operative to split the optical carrier 242 into orthogonally-polarized components 246, 248 that are modulated by respective electrical-to-optical modulators 250, 252 to produce modulated polarized optical signals 254, 256 that are combined by a beam combiner 258, thus yielding an optical signal 260.

An application-specific integrated circuit (ASIC) 202 is operative to produce I and Q analog drive signals 232, 234 to drive the electrical-to-optical modulator 250. The ASIC 202 is operative to produce I and Q analog drive signals 236, 238 to drive the electrical-to-optical modulator 252.

The ASIC 202 may be operative to apply FEC encoding 206 to the client data bits 204, thereby generating FEC-encoded bits 208. The FEC-encoded bits 208 may be mapped to multi-bit symbols in accordance with a specific code, as denoted by bit-to-symbol mapping 210. The bit-to-symbol mapping 210 may produce a stream of multi-bit symbols 212.

The ASIC 202 further comprises a transmit digital signal processor (DSP) 214 and a plurality of digital-to-analog converters (DACs). The transmit DSP 214 is operative to process the symbols 212, for example, by performing one or more of pulse shaping, subcarrier multiplexing, chromatic dispersion precompensation, and distortion precompensation on the symbols. The processing performed by the transmit DSP 214 may include the application of one or more filters, which may involve the application of one or more Fast Fourier Transforms (FFTs) and one or more corresponding inverse FFTs (IFFTs).

Based on the symbols 212 and a selected modulation scheme, the transmit DSP 214 is operative to generate four digital drive signals at a particular timeslot, t, corresponding to the four dimensions XI, XQ, YI, YQ. For example, digital drive signals 216, 218 may correspond to the I and Q components, respectively, of the X polarization, while digital drive signals 220, 222 may correspond to the I and Q components, respectively, of the Y polarization. According to this example, at the timeslot, t, the digital drive signals 216, 218 may be denoted $S_{XI}(t)$, $S_{XQ}(t)$, respectively, while digital drive signals 220, 222 may be denoted $S_{YI}(t)$, $S_{YQ}(t)$, respectively.

The digital drive signals 216, 218, 220, 222 may be converted by respective DACs 224, 226, 228, 230 into the analog drive signals 232, 234, 236, 238, respectively. As previously described, the analog drive signals 232, 234, 236, 238 are used to drive the electrical-to-optical modulators 250, 252, which ultimately results in the optical signal 260.

The transmitter 200 may comprise additional components that are not described in this document.

Figure 3:
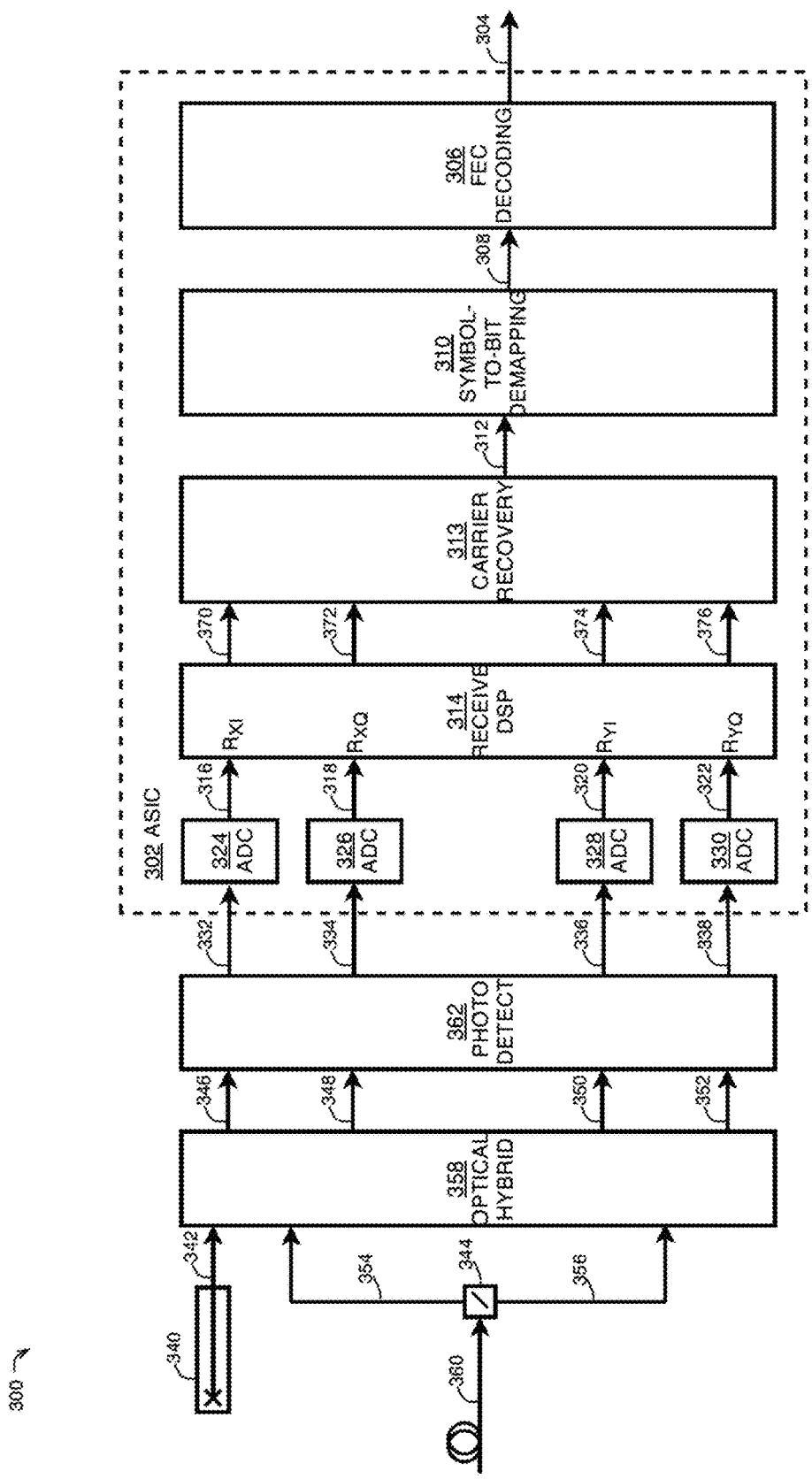
FIG. 3 illustrates an example receiver in accordance with the technology disclosed herein.

FIG. 3 is a block diagram illustration of an example receiver section of a transceiver ("receiver 300"), in accordance with examples of the technology disclosed herein.

The receiver 300 is operative to recover corrected client data bits 304 from a received optical signal 360. The received optical signal 360 may comprise a degraded version of the optical signal 260 generated by the transmitter 200, where the degradations in the received optical signal 360 may have been caused, for example, by one or more of noise, nonlinear effects, PDL, and imperfections in analog signal processing performed at the transmitter 200. A polarizing beam splitter 344 is operative to split the received optical signal 360 into orthogonally-polarized components 354, 356. An optical hybrid 358 is operative to process the components 354, 356 with respect to an optical signal 342 produced by a laser 340. Photodetectors 362 are operative to convert the outputs 346, 348, 350, 352 of the optical hybrid 358 to received analog signals 332, 334, 336, 338, respectively. The four received analog signals correspond to the four dimensions XI, XQ, YI, YQ at a particular timeslot, t.

An ASIC 302 comprises analog-to-digital converters (ADCs) 324, 326, 328, 330 which are operative to sample the received analog signals 332, 334, 336, 338, respectively, and to generate received digital signals 316, 318, 320, 322, respectively. In one example, the received analog signals 332, 334 may correspond to the I and Q components, respectively, of the X polarization, while the received analog signals 336, 338 may correspond to the I and Q components, respectively, of the Y polarization. According to this example, at the timeslot, t, the received digital signals 316, 318 may be denoted $R_{XI}(t)$, $R_{XQ}(t)$, respectively, while the received digital signals 320, 322 may be denoted $R_{YI}(t)$ and $R_{YQ}(t)$, respectively.

The ASIC 302 comprises a receive DSP 314 which is operative to process the received digital signals 316, 318, 320, 322. For example, the receive DSP 214 may be operative to apply one or more filters to the digital signals 316, 318, 320, 322, which may involve the application of one or more FFTs and one or more corresponding IFFTs. The receive DSP 314 may output digital signals 370, 372, 374, 376 based on the digital signals 316, 318, 320, 322.

The ASIC 302 is operative to apply a carrier recovery process 313 to the digital signals 370, 372, 374, 376 in order to derive symbol estimates 312 for the two orthogonal polarizations. The symbol estimates 312 are estimates of the symbols 212 that were generated by the bit-to-symbol mapping 210 performed at the transmitter 200.

The ASIC 302 is operative to apply symbol-to-bit demapping 310 to the symbol estimates 312 in order to derive bit estimates 308. The symbol-to-bit demapping 310 involves applying an inverse of the code that was used in the bit-to-symbol mapping 210. The bit estimates 308 are estimates of the bits 208 that were generated by the FEC encoding 206 at the transmitter 200. A bit estimate may comprise a binary value, or may comprise a confidence value, such as log-likelihood ratio. In the case of a binary value (i.e., a bit), log-likelihood ratio (LLR) is defined as the logarithm of the ratio of the probability of the bit being equal to one to the probability of the bit being equal to zero. For example, for a bit "b", $$LLR(b) = \log \frac{P(b=1)}{P(b=0)},$$

where P denotes probability. For non-binary values, such as a set of integers, other metrics could be used, such as the logarithm of the probability of a given integer value divided by the sum of the probabilities of the other possible integer values, for example.

The ASIC 302 is operative to apply FEC decoding 306 to the bit estimates 308 in order to recover the corrected client data bits 304. The FEC decoding 306 may comprise hard-decision decoding or soft-decision decoding. One example of soft-decision decoding is Maximum Likelihood (ML) decoding. If the FEC decoding 306 is able to correct all errors present in the FEC-encoded bit estimates 308, then the corrected client data bits 304 will be identical to the original client data bits 204. If the FEC decoding 306 is unable to correct all errors present in the FEC-encoded bit estimates 308, then the corrected client data bits 304 will differ from the original client data bits 204. In this case, the FEC scheme chosen for the FEC encoding 206 and FEC decoding 306 will be considered to have failed.

The receiver 300 may comprise additional components that are not described in this document.

The success or failure of a given FEC scheme depends on its strength relative to the extent of the errors present in the FEC-encoded bit estimates. FEC decoding will generally respond to the average BER of the FEC-encoded bit estimates to which it is applied. The average BER observed at the input of the FEC decoding may be denoted $BER_{FEC\_AVG}$. Hard decision FEC decoding may be unable to correct all of the errors in the FEC-encoded bit estimates when $BER_{FEC\_AVG}$ exceeds some threshold, denoted $BER_{THRESH}$. In other words, the FEC scheme used for the FEC encoding at the transmitter and the FEC decoding at the receiver is expected to fail when $BER_{FEC\_AVG} > BER_{THRESH}$. In one example, $BER_{THRESH}$ is on the order of $3.84 \times 10^{-3}$.

Generally, the BER of the FEC-encoded bit estimates 308 is expected to increase as the noise in the received optical signal 360 increases. The precise relationship between the noise-to-signal ratio (NSR) and BER depends on the code used for the bit-to-symbol mapping 210 and modulation scheme used by the transmit DSP 214 to convert the symbols 212 to the digital drive signals 216, 218, 220, 222, and also on the shape of the four-dimensional probability density function of the noise, in the event that the noise is not isotropic Gaussian noise.

Figure 4:
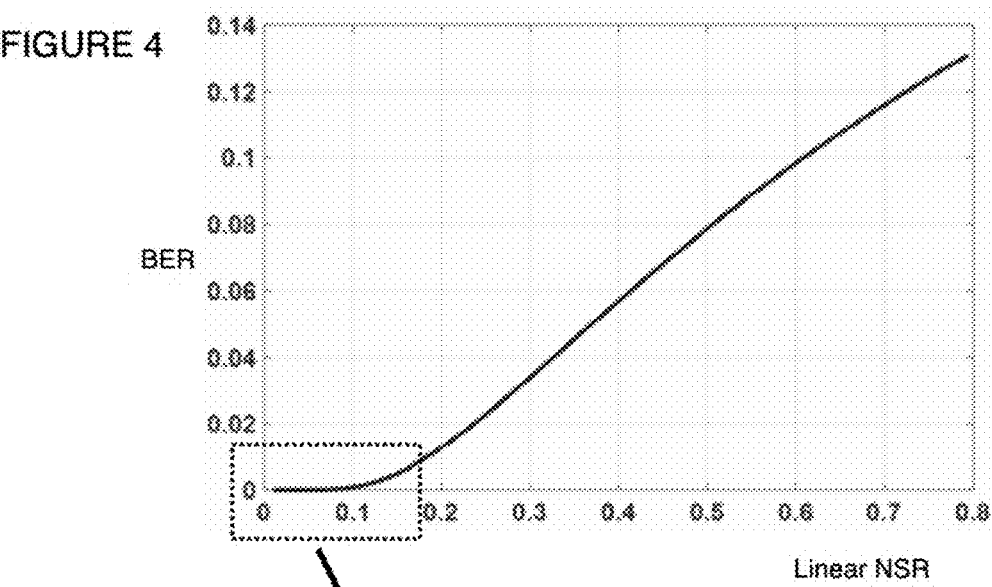
FIG. 4 illustrates a plot of bit error rate (BER) as a function of the linear noise-to-signal ratio (NSR) for a 64-level quadrature amplitude modulation (64-QAM) scheme.

FIG. 4 illustrates a plot of BER as a function of the linear NSR for a 64-level quadrature amplitude modulation (64-QAM) scheme.

There may be circumstances in which different streams of bits (or symbols) experience different noise levels. For example, as described previously, PDL may cause different polarizations to have different noise levels. Thus, for example, symbols transmitted in the X polarization may exhibit a different level of the noise than symbols transmitted in the Y polarization. It follows that the FEC-encoded bit estimates determined from one symbol stream may have a different BER than the FEC-encoded bit estimates determined from another symbol stream.

One may consider a simple example in which a first set of FEC-encoded bit estimates exhibits a first BER, denoted $BER_A$, and a second set of FEC-encoded bit estimates exhibits a second BER, denoted $BER_B$, where $BER_A \neq BER_B$. If the number of FEC-encoded bit estimates in each set is equal, the average BER across the two sets would be $BER_{FEC\_AVG} = (BER_A + BER_B)/2$. If hard decision FEC decoding is applied to the two sets, the FEC scheme is expected to fail if $BER_{FEC\_AVG} = (BER_A + BER_B)/2$ exceeds $BER_{THRESH}$ for the FEC scheme. This is because the performance of the FEC depends on the average BER of the FEC-encoded bit estimates to which it is applied.

Figure 5:
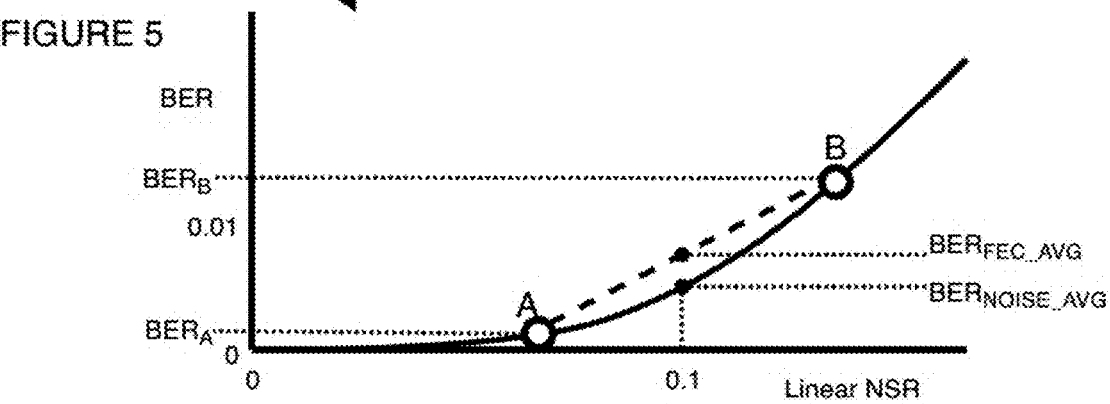
FIG. 5 illustrates a magnified portion of the plot illustrated FIG. 4 with example points A and B.

The differing BER values of the FEC-encoded bit estimates are the result of differing noise levels in the symbol estimates from which the FEC-encoded bit estimates were determined. As an alternative to applying FEC decoding to sets of bits that exhibit the different BERs, there may be advantages to achieving a more uniform noise level across the symbol estimates, such that the FEC-encoded bit estimates determined from the symbol estimates have a more uniform BER. A more uniform noise level may be achieved across all symbol estimates by averaging the different noise levels exhibited by different groups of symbol estimates. Examples of how this noise averaging may be achieved will be described in detail with respect to FIGS. 7-15.

Where a noise averaging technique has been applied, the symbol estimates generated at the receiver may have a substantially uniform noise level, such that the resulting FEC-encoded bit estimates have a substantially uniform BER, which may be denoted $BER_{NOISE\_AVG}$. In contrast to $BER_{FEC\_AVG}$, which is determined by directly averaging $BER_A$ and $BER_B$, $BER_{NOISE\_AVG}$ is determined using the relationship between BER and symbol noise for the specific modulation scheme being used. For example, FIG. 5 illustrates a magnified portion of the plot illustrated in FIG. 4, with example points A and B denoting two sets of symbol estimates having two different noise levels which are associated with $BER_A$ and $BER_B$, respectively. As illustrated in FIG. 5, a calculation of $BER_{FEC\_AVG}$ may be represented schematically by drawing a straight line between points A and B on the curve, and then determining the BER that corresponds to the center point of that line. In contrast, $BER_{NOISE\_AVG}$ may be determined by first determining the average linear NSR associated with $BER_A$ and $BER_B$, and then using the curve to determine the BER that corresponds to this average linear NSR. It is apparent from the magnified plot of FIG. 5, that $BER_{NOISE\_AVG}$ is less than $BER_{FEC\_AVG}$. In other words, performing an operation that averages the noise across the two sets of symbols will result in a uniform BER ($BER_{NOISE\_AVG}$) that is less than the average BER that the FEC scheme would be responding to ($BER_{FEC\_AVG}$) if the noise averaging operation is not performed.

It may be of interest to ensure that the bit estimates undergoing FEC decoding have a BER that is as low as possible, so as to reduce the likelihood that the FEC decoding will fail, or to permit the use of a higher rate FEC scheme that requires less overhead. Accordingly, for the example points A and B in FIG. 5, it may be of interest to implement a noise averaging technique so that the FEC decoding only needs to respond to the lower value of $BER_{NOISE\_AVG}$, instead of the higher value of $BER_{FEC\_AVG}$, that the FEC decoding would need to handle in the absence of noise averaging.

However, there are other examples in which it may be of interest for the FEC decoding to handle bit estimates having a range of BERs, such that the FEC responds to $BER_{FEC\_AVG}$, rather than using noise averaging to generate a uniform value of $BER_{NOISE\_AVG}$. Referring to FIG. 5, $BER_{NOISE\_AVG}$ is less than $BER_{FEC\_AVG}$ because the points A and B are located in a convex region of the curve in FIG. 4. However, it may be shown that there are other points on the curve, specifically those located in the concave region of the curve in FIG. 4, for which $BER_{NOISE\_AVG}$ is greater than $BER_{FEC\_AVG}$.

Figure 6:
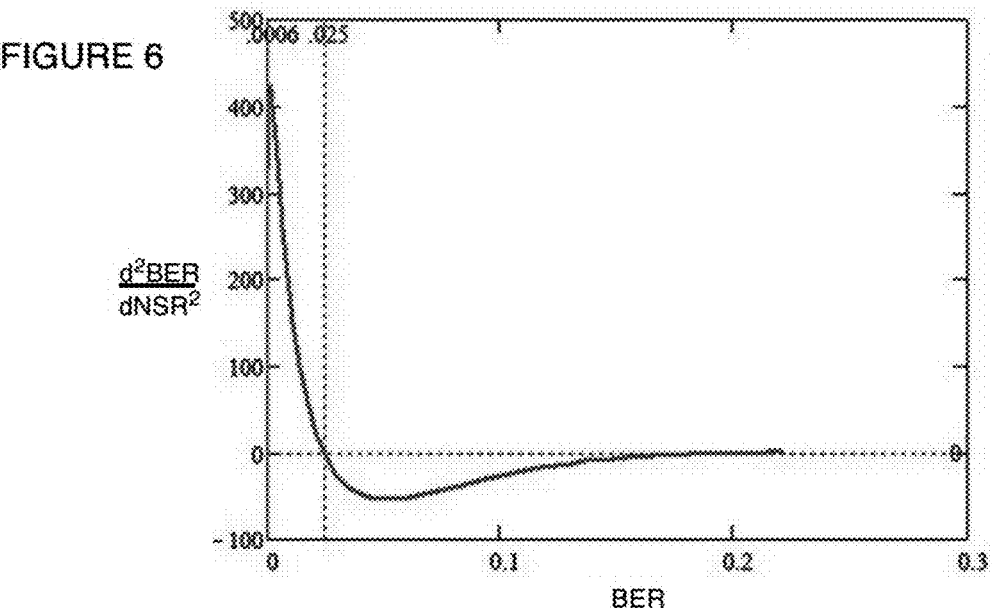
FIG. 6 illustrates the second derivative of the BER in FIG. 4 with respect to the NSR, plotted as a function of BER.

The convex and concave regions of the curve in FIG. 4 may be more easily distinguished from one another by considering the second derivative of BER with respect to linear NSR, which is plotted as a function of BER in FIG. 6. Those BER values for which the second derivative is positive correspond to the convex region of the curve in FIG. 4, whereas those BER values for which the second derivative is negative correspond to the concave region of the curve in FIG. 4. As is apparent from FIG. 6, BER values of less than 0.025 are within the convex region, whereas BER values of greater than 0.025 are within the concave region. Although not explicitly illustrated, it may be shown that, for two points located in the concave region (i.e., corresponding to two different BER values, each greater than 0.025), applying a noise averaging operation may result in a single uniform BER value, $BER_{NOISE\_AVG}$, that is greater than the value of $BER_{FEC\_AVG}$ for the two points. This is one example in which it may be preferable to let the FEC respond to $BER_{FEC\_AVG}$, rather than using noise averaging.

The choice of whether to perform noise averaging may depend on the different noise levels (and BERs) in question. In U.S. patent application Ser. No. 15/672,434 filed on Aug. 9, 2017, Oveis-Gharan et al. describe a technique referred to as contrast coding, in which noise is redistributed to generate different classes of bit estimates, where each class may be associated with a different average BER. Within a given class, the effects of PDL may produce a range of BER values. The choice of whether to let the FEC decoding handle the range of BER values, or whether to instead perform a noise averaging operation may depend on the average BER of the class. For example, a low-BER class may include a range of BER values located within the convex portion of the curve in FIG. 4. In this case, it may be advantageous to handle the PDL by using a noise averaging operation to obtain a substantially uniform BER value within the class. In another example, a high-BER class may include a range of BER values located within the concave portion of the curve in FIG. 4. In this case, it may be advantageous to handle the PDL by letting the FEC decoding respond directly to the range of BER values within the class.

Returning to FIG. 2, the optical signal 260 is generated at the transmitter 200 by modulating dimensions of the CW optical carrier 242 to represent the stream of multi-bit symbols 212. The modulating is achieved using the digital drive signals 216, 218, 220, 222. In a simple example, a single multi-bit symbol may be represented in four dimensions XI, XQ, YI, YQ at a single timeslot, t, by using the digital drive signals $S_{XI}(t)$, $S_{XQ}(t)$, $S_{YI}(t)$, $S_{YQ}(t)$, respectively.

However, rather than restricting the dimensions used to represent the multi-bit symbol to a single timeslot, it may be advantageous for those dimensions to be distributed over two or more distinct timeslots. These timeslots may be consecutive or non-consecutive. The timeslots may be spread out over a longer time span based on interleaving. By representing each multi-bit symbol using dimensions that span a plurality of timeslots, it may be possible to average signal degradations, including degradations caused by one or more of noise, nonlinear effects, PDL, and analog imperfections.

For the purposes of the following examples, the term "dimensional transformation" may be understood as an operation that results in transformed digital drive signals that are used at a transmitter to modulate dimensions of an optical carrier to represent multi-bit symbols. According to some examples, the transformed digital drive signals resulting from the dimensional transformation modulate the optical carrier such that each multi-bit symbol is represented using a plurality of first dimensions of the optical carrier, where the first dimensions are distributed over two or more distinct timeslots. According to some examples, the transformed digital drive signals are generated as a result of applying the dimensional transformation to preliminary digital drive signals, the preliminary digital drive signals having been designed to modulate dimensions of the optical carrier to represent multi-bit symbols according to a specific modulation scheme. According to some examples, the preliminary digital drive signals may have been designed to modulate the optical carrier such that each multi-bit symbol is represented using a plurality of second dimensions, where the plurality of second dimensions is less than the plurality of first dimensions. In other words, the effect of the dimensional transformation may be to increase the number of dimensions over which each multi-bit symbol is represented, thereby resulting in transformed digital drive signals that cause each multi-bit symbol to be represented by more dimensions than would be the case if the preliminary digital drive signals were used to modulate the optical carrier to represent each multi-bit symbol.

The dimensional transformation may be implemented as one or more serial steps, as one or more parallel steps, or as a combination of both serial and parallel steps. In some examples, the dimensional transformation may comprise the application of a matrix transformation. For example, digital signals corresponding to specific dimensions may undergo matrix multiplication as part of the dimensional transformation. The matrix transformation may be linear or substantially linear. The matrix transformation may be a unitary or substantially unitary. That is, the inverse of the matrix transformation may be equal to or substantially equal to the complex conjugate transpose of the matrix transformation. In some examples, the linear operation based on matrix multiplication may be replaced by other forms of linear filtering. In some examples, the dimensional transformation may comprise using preliminary digital signals to determine corresponding transformed digital signals based on information stored in a database, such as a look-up table (LUT).

For the purposes of the following examples, the term "inverse dimensional transformation" may be understood as an operation which is applied to received digital signals, where the received digital signals correspond to dimensions of an optical signal received at a receiver. According to some examples, each multi-bit symbol may be represented by received digital signals corresponding to a plurality of first dimensions of the optical signals, where the first dimensions may be distributed over two or more distinct timeslots. Application of the inverse dimensional transformation may result in preliminary digital drive signal estimates, which correspond to a plurality of second dimensions. According to some examples, the plurality of second dimensions may be less than the plurality of first dimensions. In other words, the effect of the inverse dimensional transformation may be to decrease the number of dimensions over which each multi-bit symbol is represented, thereby resulting in preliminary digital drive signal estimates that represent each multi-bit symbol using fewer dimensions than the dimensions of the received optical signal that were used to represent each multi-bit symbol. The decrease in "dimensionality" of the multi-bit symbols may facilitate soft-decoding at the receiver.

The inverse dimensional transformation may be implemented as one or more serial steps, as one or more parallel steps, or as a combination of both serial and parallel steps. In some examples, the inverse dimensional transformation may comprise the application of a matrix transformation. The matrix transformation may be linear or substantially linear. The matrix transformation may be a unitary or substantially unitary. An advantage of using an inverse dimensional transformation that comprises a unitary matrix is that application of such a matrix does not enhance noise.

According to some examples, a dimensional transformation may be applied to preliminary digital drive signals at a transmitter, thereby generating transformed digital drive signals which are used to modulate an optical carrier to generate an optical signal. The optical signal may be transmitted by the transmitter to a receiver. At the receiver, an inverse dimensional transformation may be applied to received digital signals, where the received digital signals correspond to dimensions of a degraded version of the optical signal that was transmitted by the transmitter. The inverse dimensional transformation may comprise an operation that is substantially the inverse of a dimensional transformation applied at a transmitter. For example, where the dimensional transformation comprises the application of a first matrix transformation, the inverse dimensional transformation may comprise the application of a second matrix transformation, where the second matrix transformation is substantially the inverse of the first matrix transformation. As a result of applying the inverse dimensional transformation to the received digital signals, preliminary digital drive signal estimates may be determined at the receiver. The preliminary digital drive signal estimates are estimates of the preliminary digital drive signals to which the dimensional transformation was applied at the transmitter.

As will be described in the specific examples that follow, the dimensional transformation and the inverse dimensional transformation may comprise additional operations, such as complex conjugate operations that are applied to a subset of signals, or signal interleaving.

When the range of noise levels of received signals are such that they correspond to the convex region of the curve that relates BER to linear NSR, such as the curve in FIG. 4, application of an inverse dimensional transformation, such as those described herein, may have an effect of making the noise levels more uniform (i.e., by averaging the noise levels, as described previously). However, when the range of noise levels of the received signals are such that they correspond to the concave region of the curve, application of the inverse dimensional transformation may be designed to have an effect of emphasizing the distinction between the noise levels. For certain applications, enhancing the differences between noise levels may be advantageous. In one example, multidimensional constellations that are non-prismatic may cover all four dimensions XI, XQ, YI, YQ within one or more timeslots. A dimensional transformation may be used to map streams of these symbols into purely X polarization and purely Y polarization dimensions across twice as many timeslots. PDL may produce unequal noise variances on these streams. When the range of noise levels of the received signals are such that they correspond to the concave region of the curve, unequal noise variances may be better handled FEC. Therefore, in such circumstances, it may be of interest to emphasize the inequality using the inverse dimensional transformation.

Referring to FIG. 2, the signal processing performed at the transmit DSP 214 may comprise applying a dimensional transformation to preliminary digital drive signals, which may be denoted by $\hat{S}_{XI}, \hat{S}_{XQ}, \hat{S}_{YI}, \hat{S}_{YQ}$. For simplicity, $\hat{S}_X$ may be used throughout this document to denote the combination of $\hat{S}_{XI}$ and $\hat{S}_{XQ}$, while $\hat{S}_Y$ may be used throughout this document to denote the combination of $\hat{S}_{YI}$ and $\hat{S}_{YQ}$. For simplicity of this description, the proposed technology is described in terms of modifications applied to traditional systems and methods. Therefore, in FIG. 2, the preliminary digital drive signals are the digital drive signals determined by the transmitter, based on a specific modulation scheme, to be used in the commonly understood case for modulating orthogonal polarizations of an optical carrier in order to represent multi-bit symbols. That is, the preliminary digital drive signals $\hat{S}_X, \hat{S}_Y$, are designed for modulating a plurality of dimensions of the optical carrier in order to represent digital information according to a specific modulation scheme. However, the proposed technology need not be implemented as a change to known methods, and thus the preliminary digital drive signals could be any modulation of a plurality of mathematical dimensions. The preliminary digital drive signals may be most simply represented by one physical digital integer per dimension, per timeslot. However, a generally equivalent function may be obtained with other representations, or by being part of a mathematical operation beyond what is described in these examples. The application of the dimensional transformation to the preliminary digital drive signals $\hat{S}_X, \hat{S}_Y$ may generate transformed digital drive signals. The transformed digital drive signals may be denoted by $\hat{S}_X, \hat{S}_Y$, respectively, where $\hat{S}_X$ is used throughout this document to denote the combination of $S_{XI}$ and $S_{XQ}$, and $S_Y$ is used throughout this document to denote the combination of $S_{YI}$ and $S_{YQ}$. As will be described further with respect to specific examples, application of the dimensional transformation to a plurality of preliminary digital drive signals may result in a plurality of transformed digital drive signals, where each transformed digital drive signal is to be used in the modulation of a respective one of a plurality of dimensions of the optical carrier, and where the dimensions are distributed over two or more distinct timeslots. In some examples, the plurality of preliminary digital drive signals to which the dimensional transformation is applied may also be representative of two or more distinct timeslots.

Referring to FIG. 3, the signal processing performed at the receive DSP 314 may comprise applying an inverse dimensional transformation to received digital signals, which may be denoted by $R_{XI}, R_{XQ}, R_{YI}, R_{YQ}$. For simplicity, $R_X$ may be used throughout this document to denote the combination of $R_{XI}$ and $R_{XQ}$, while $R_Y$ may be used throughout this document to denote the combination of $R_{YI}$ and $R_{YQ}$. The application of the inverse dimensional transformation to received digital signals $R_X, R_Y$ may generate digital signals $\hat{R}_X, \hat{R}_Y$, respectively, where $\hat{R}_X$ is used throughout this document to denote the combination of $\hat{R}_{XI}$ and $\hat{R}_{XQ}$, and $\hat{R}_Y$ is used throughout this document to denote the combination of $\hat{R}_{YI}$ and $\hat{R}_{YQ}$. The digital signals $\hat{R}_X, \hat{R}_Y$ correspond to estimates of preliminary digital drive signals $\hat{S}_X, \hat{S}_Y$, respectively. The carrier recovery process 313 may be applied to the preliminary digital drive signal estimates $\hat{R}_X, \hat{R}_Y$. As will be described further with respect to specific examples, the inverse dimensional transformation may be applied to a plurality of received digital signals, where each received digital signal is representative of a respective one of a plurality of dimensions of a received optical signal, and where the dimensions are distributed over two or more distinct timeslots. In some examples, the preliminary digital drive signal estimates that result from the inverse dimensional transformation may also be representative of dimensions that are distributed over two or more distinct timeslots.

The application of the dimensional transformation at the transmitter and the inverse dimensional transformation at the receiver differs from the disclosures of Khandani et al. in U.S. Pat. Nos. 8,718,491 and 9,602,207, in which a transmit Jones rotation matrix is applied at the transmitter, and a noise whitening matrix is applied at the receiver. The noise whitening matrix is not the inverse of the Jones rotation matrix. Furthermore, the dimensional transformation disclosed herein may be used to average the noise across polarizations, without tracking the changing optical line.

In contrast to the gold and silver codes described by Mumtaz et al., the application of the dimensional transformation and inverse dimensional transformation, as described herein, does not require complex circuitry to implement. Multiplication with a unitary matrix involves simple, inexpensive computations relative to those needed to implement gold and silver codes. Accordingly, a dimensional transformation may provide an alternative to gold and silver codes that is less costly in terms of heat production and power use.

In "Filtering-tolerant transmission by the Walsh-Hadamard transform for super-channel beyond 100 Gb/s," *Optical Society of America,* 2015, Shibahara et al. describe a method for improving super-channel performance by dispersing optical filtering distortions over all subcarriers of a super-channel. The method involves applying a Walsh-Hadamard transform (WHT) to the subcarriers, where each subcarrier corresponds to a different wavelength.

In "Twin-Wave-Based Optical Transmission with Enhanced Linear and Nonlinear Performances," *Journal of Lightwave Technology,* Vol. 33, Issue 5, pp. 1037-1043 (2015), Liu describes a method for converting a binary phase-shift keying (BPSK) signal to a "Twin-Wave" QPSK signal, with conjugate phase properties. Liu's method involves matrix multiplication using a unitary matrix. However, Liu's method does not involve received digital signals corresponding to first dimensions of an optical signal that are representative of a single multi-bit symbol, where the first dimensions are distributed over two or more distinct timeslots. That is, Liu's method does not involve the application of a time-memory or inter-time transformation. Liu's method involves BPSK which encodes one bit per symbol.

In "A Pragmatic Approach to Trellis-Coded Modulation," *IEEE Communications Magazine,* Vol. 27, Issue 7, pp. 11-19 (1989), Viterbi et al. describe techniques for trellis or convolution coding, in which the effect of a symbol may be distributed across multiple timeslots. In order to decode a bitstream that has been encoded using a trellis code, a Viterbi decoder may be used. The decoding of a trellis-encoded bitstream does not involve any inverse dimensional transformation that has the effect of reducing the dimensionality of symbols.

U.S. Pat. No. 3,388,330 to Kretzmer et al. describes a partial response multilevel data system in which channel response to a single symbol extends over more than one symbol interval. Kretzmer et al. do not describe any inverse dimensional transformation that has the effect of reducing the dimensionality of symbols.

Figure 7:
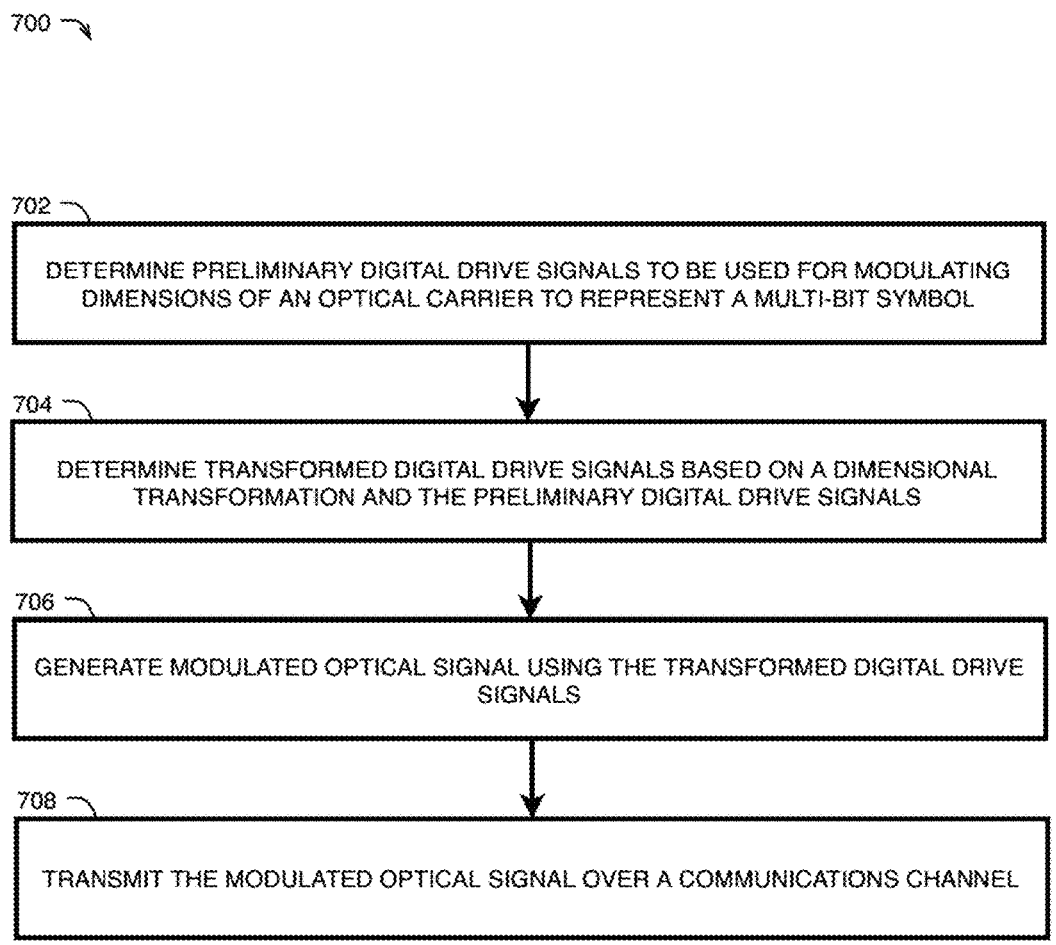
FIG. 7 illustrates an example method for implementing a dimensional transformation at a transmitter.

FIG. 7 illustrates an example method 700 for implementing a dimensional transformation at a transmitter, such as the transmitter 200. The method 700 may be implemented by a DSP of the transmitter, such as the transmit DSP 214.

At 702, based on a specific modulation scheme, the transmitter may determine preliminary digital drive signals to be used for modulating dimensions of an optical carrier in order to represent multi-bit symbols of a symbol stream. Each multi-bit symbol may be represented by preliminary digital drive signals that correspond to a plurality of dimensions, where the dimensions comprise a specific combination of the dimensions XI, XQ, YI, YQ at a single timeslot. For simplicity, the dimensions over which each multi-bit symbol is represented using the preliminary digital drive signals are herein denoted as "second dimensions." The preliminary digital drive signals at a timeslot, t, may be denoted $\hat{S}_X(t)$, $\hat{S}_Y(t)$.

At 704, the transmitter may determine transformed digital drive signals based on a dimensional transformation and the preliminary digital drive signals determined at 702. In one example, the transmitter may generate the transformed digital drive signals by applying the dimensional transformation directly to the preliminary digital drive signals determined at 702. In another example, the transmitter may generate the transformed digital drive signals by applying the dimensional transformation to digital signals that are based on the preliminary digital drive signals determined at 702. In another example, the transmitter may determine the transformed digital drive signals using a LUT corresponding to the dimensional transformation.

Application of the dimensional transformation may result in transformed digital drive signals that are designed to modulate the optical carrier such that each multi-bit symbol is represented by a plurality of dimensions of the optical carrier, which are denoted herein as "first dimensions" to distinguish them from the dimensions over which each multi-bit symbol is represented using the preliminary digital drive signals. The first dimensions differ from the second dimensions. The first dimensions comprise a specific combination of the dimensions XI, XQ, YI, YQ at two or more distinct timeslots. According to some examples, the plurality of second dimensions is less than the plurality of first dimensions. Given preliminary digital drive signals at a timeslot, t, denoted $\hat{S}_X(t)$, $\hat{S}_Y(t)$, the transformed digital drive signals at the same timeslot, t, may be denoted $S_X(t)$, $S_Y(t)$, respectively.

At 706, the transmitter may generate a modulated optical signal using the transformed digital drive signals that were determined at 704. For example, as described with respect to FIG. 2, the generation of the modulated optical signal may be achieved by converting the transformed digital drive signals $S_X(t)$, $S_Y(t)$, into respective analog drive signals, driving electrical-to-optical modulators with the analog drive signals to generate modulated polarized optical signals, and combining the modulated polarized optical signals to form an optical signal, such as the optical signal 260. Instead of the modulated optical signal having been generated using the preliminary digital drive signals, which were designed to represent each multi-bit symbol using a plurality of second dimensions, the modulated optical signal is generated using the transformed digital drive signals, which are designed to represent each multi-bit symbol using a plurality of first dimensions, where the first dimensions are distributed over two or more distinct timeslots.

At 708, the transmitter may transmit the modulated optical signal over a communications channel. As a result of the modulation having been performed using the transformed digital drive signals, each multi-bit symbol may be represented using first dimensions of the optical signal, where the first dimensions are distributed over two or more distinct timeslots.

Figure 8:
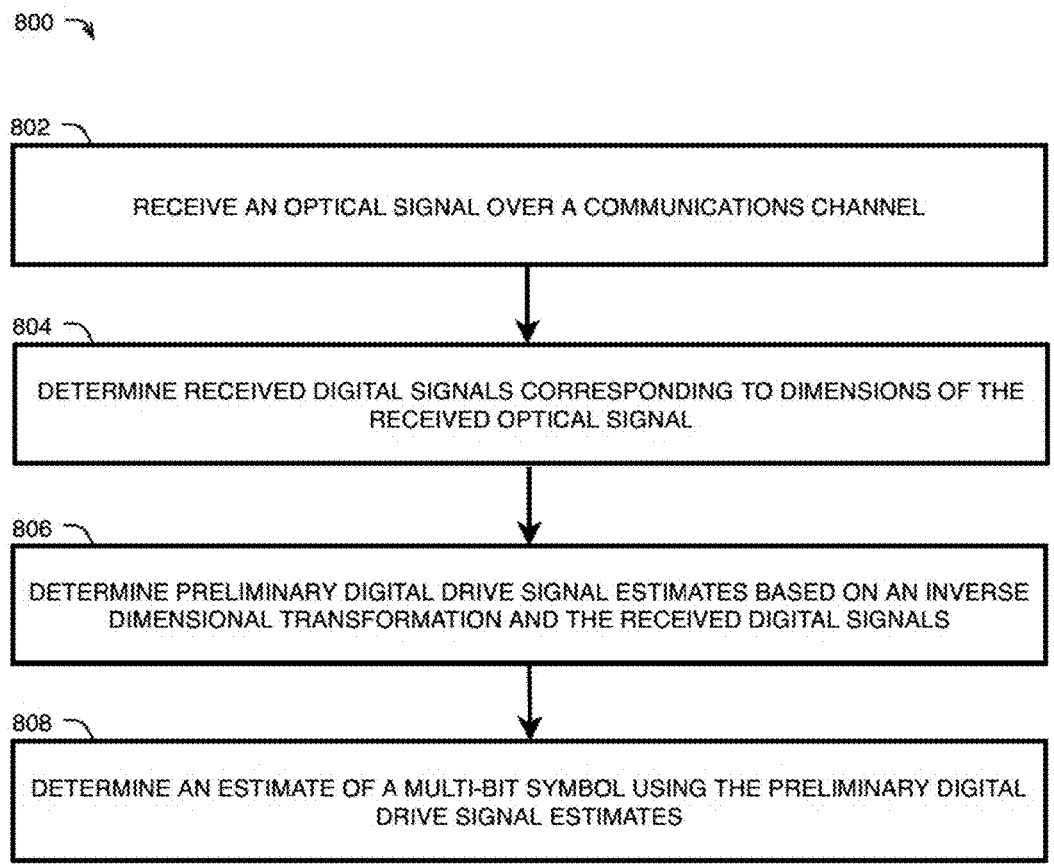
FIG. 8 illustrates an example method for implementing an inverse dimensional transformation at a receiver.

FIG. 8 illustrates an example method 800 for implementing an inverse dimensional transformation at a receiver, such as the receiver 300. The method 800 may be implemented by a DSP of the receiver, such as the receive DSP 314.

At 802, the receiver may receive an optical signal. The received optical signal may be representative of a stream of multi-bit symbols. According to some examples, received optical signal may comprise a degraded version of a modulated optical signal generated at a transmitter according to the method 700. That is, the received optical signal may have been generated by modulating a plurality of first dimensions of an optical carrier to represent each multi-bit symbol. The first dimensions may comprise a specific combination of the dimensions XI, XQ, YI, YQ at two or more timeslots.

At 804, the receiver may determine digital signals corresponding to dimensions of the received optical signal. For example, as described with respect to FIG. 3, a received optical signal, such as the signal 360, may be split into orthogonally-polarized components using a polarizing beam splitter. An optical hybrid may process the components with respect to an optical signal, and photodetectors may convert the outputs of the optical hybrid to analog signals, which may be converted to received digital signals. At a particular timeslot, t, the received digital signals may be denoted by $R_X(t)$, $R_Y(t)$.

At 806, the receiver may determine preliminary digital drive signal estimates based on an inverse dimensional transformation and the received digital signals determined at 804. In one example, the receiver may generate the preliminary digital drive signal estimates by applying the inverse dimensional transformation directly to the received digital signals determined at 804. In another example, the receiver may generate the preliminary digital drive signal estimates by applying the inverse dimensional transformation to digital signals that are based on the received digital signals determined at 804.

Application of the inverse dimensional transformation results in each multi-bit symbol being represented by preliminary digital drive signal estimates that correspond to a plurality of dimensions, which are denoted herein as "second dimensions" to distinguish them from the dimensions over which each multi-bit symbol is represented using the received digital signals. The second dimensions may correspond to the second dimensions described with respect to the method 700. The second dimensions differ from the first dimensions. The second dimensions comprise a specific combination of the dimensions XI, XQ, YI, YQ at a single timeslot. According to some examples, the plurality of second dimensions is less than the plurality of first dimensions. Given received digital signals at a timeslot, t, denoted $R_X(t)$, $R_Y(t)$, the preliminary digital drive signal estimates at the same timeslot, t, may be denoted $\hat{R}_X(t)$, $\hat{R}_Y(t)$, respectively. Where the inverse dimensional transformation is substantially the inverse of a dimensional transformation that was applied at a transmitter at 704, the digital signals $\hat{R}_X(t)$, $\hat{R}_Y(t)$ may be estimates of the preliminary digital drive signals $\hat{S}_X(t)$, $\hat{S}_Y(t)$, respectively, that were determined at 702.

At 808, the receiver may determine estimates of multi-bit symbols using the preliminary digital drive signal estimates determined at 806. For example, this determination may include applying the carrier recovery process 313, as described with respect to FIG. 3, to the digital signals $\hat{R}_X(t)$, $\hat{R}_Y(t)$ generated at 804. Each symbol estimate determined at 808 may subsequently undergo symbol-to-bit mapping, such as that denoted by 310 in FIG. 3, in order to recover corresponding bit estimates. Where the symbols are comprised of FEC-encoded bits, the bit estimates may subsequently undergo FEC decoding, such at that denoted by 306 in FIG. 3, thereby generating corrected client data bits.

The remainder of this document provides example techniques for implementing a dimensional transformation at a transmitter and a corresponding inverse dimensional transformation at a receiver. In the following examples, the dimensional transformation is applied by a DSP of a transmitter, such as the transmit DSP 214 of the transmitter 200. The inverse dimensional transformation is applied by a DSP of a receiver, such as the receiver DSP 314 of the receiver 300.

Application of the dimensional transformations and corresponding inverse dimensional transformations described in the following examples may be used to average signal degradations across a plurality of signal dimensions, including degradations caused by one or more of noise, nonlinear effects, PDL, and analog imperfections.

According to some examples, matched filtering may be applied at the transmitter and receiver, in order to achieve low noise levels. Substantially zero inter-symbol interference may be achieved, for example, using a matched filter selected from the raised cosine family.

According to some examples, an adaptive equalization circuit may be employed at the receiver to correct for PMD, PDL, and other linear variations. This equalization can be performed in the time domain, or the frequency domain, or both, or with other transformations. Common methods for controlling this equalization include recursive least squares (RLS) equalization, constant modulus algorithm (CMA) equalization, least means squares (LMS) equalization, and decision feedback equalization (DFE). LMS equalization may provide an advantageous compromise between complexity and performance. An LMS circuit may result in noise correlation for symbols that are within a certain number, N, of integer timeslots from each other and/or for symbols over different polarizations. As previously noted, the application of a dimensional transformation and an inverse dimensional may involve sets of signals that are representative of at least a first timeslot and a second timeslot, where the timeslots are separated by an integer number, T. Where an LMS circuit is used in such examples, it may be of interest to select T to be greater than the number, M, of timeslots over which the LMS circuit generates noise correlation and/or uneven noise boosting. In this manner, noise averaging achieved by the dimensional transformation (and inverse dimensional transformation) may not be impeded as a result of the noise correlation caused by the LMS circuit. Furthermore, the dimensional transformation may be applied over dimensions with different noise levels to ensure an averaged noise level over different dimensions.

Example 1

Figure 9:
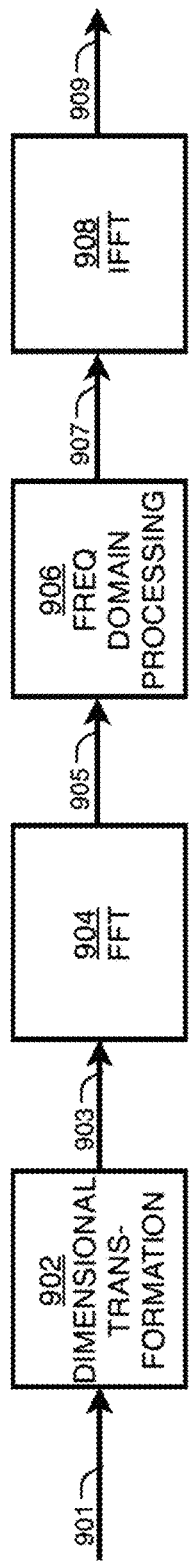
FIG. 9 is a schematic diagram illustrating the implementation of a dimensional transformation at a transmitter according to a first example.

FIG. 9 is a schematic diagram illustrating the implementation of a dimensional transformation at a transmitter according to a first example. In this example, the dimensional transformation comprises a matrix transformation $H_1$ provided in Eq. 1:

$$H_1 \triangleq \begin{pmatrix} 1 & 0 & 0 & 1 \\ 0 & 1 & 1 & 0 \\ 0 & -1 & 1 & 0 \\ -1 & 0 & 0 & 1 \end{pmatrix} \quad (1)$$

The matrix transformation $H_1$ may be applied to the preliminary digital drive signals $\hat{S}_X(t-T)$, $\hat{S}_Y(t-T)$, $\hat{S}_X(t)$, $\hat{S}_Y(t)$ to generate signals $S_X(t-T)$, $S_Y(t-T)$, $S_X^*(t)$, $S_Y^*(t)$, respectively, where t−T denotes a first integer timeslot, and t denotes a second integer timeslot. This is shown in Eq. 2.

$$\begin{pmatrix} S_X(t-T) \\ S_Y(t-T) \\ S_X^*(t) \\ S_Y^*(t) \end{pmatrix} = H_1 \begin{pmatrix} \hat{S}_X(t-T) \\ \hat{S}_Y(t-T) \\ \hat{S}_X(t) \\ \hat{S}_Y(t) \end{pmatrix} = \begin{pmatrix} 1 & 0 & 0 & 1 \\ 0 & 1 & 1 & 0 \\ 0 & -1 & 1 & 0 \\ -1 & 0 & 0 & 1 \end{pmatrix} \begin{pmatrix} \hat{S}_X(t-T) \\ \hat{S}_Y(t-T) \\ \hat{S}_X(t) \\ \hat{S}_Y(t) \end{pmatrix} \quad (2)$$

The signals $S_X(t-T)$ and $S_Y(t-T)$ denote the transformed digital drive signals at the first timeslot, t–T. The transformed digital drive signals at the second timeslot, t, that is $S_X(t)$ and $S_Y(t)$, may be determined by taking the complex conjugate of the signals $S_X^*(t)$ and $S_Y^*(t)$, respectively. Since the complex conjugate operation is only applied to the signals at the second timeslot t, and not the signals at the first timeslot, t–T, the complex conjugate operation may be referred to as a "partial complex conjugate".

As illustrated in FIG. 9, the combination of the matrix transformation $H_1$ followed by the partial complex conjugate is denoted by dimensional transformation 902. The dimensional transformation 902 is applied to preliminary digital drive signals 901 to generate transformed digital drive signals 903. The transformed digital drive signals 903 may undergo additional processing before being transformed to analog drive signals. For example, a FFT 904 may be applied to the transformed digital drive signals 903, thereby producing frequency-domain signals 905, which may subsequently undergo frequency-domain processing 906 to produce processed frequency-domain signals 907. The frequency-domain processing 906 may include the application of a matched filter. The processed frequency-domain signals 907 may be converted to corresponding time-domain signals 909 by an IFFT 908.

Figure 10:
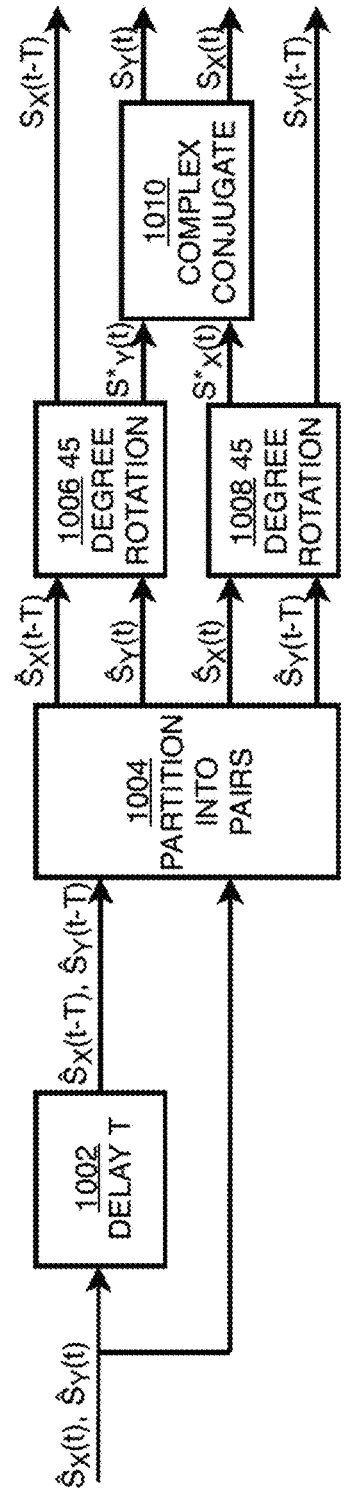
FIG. 10 is a schematic diagram illustrating example details for implementing the dimensional transformation according to the first example.

FIG. 10 is a schematic diagram illustrating example details for implementing the dimensional transformation according to the first example. That is, the dimensional transformation 902 described with respect to FIG. 9 may be implemented using the operations performed in FIG. 10.

Given preliminary digital drive signals $\hat{S}_X(t)$, $\hat{S}_Y(t)$, application of a delay of T timeslots results in preliminary digital drive signals $\hat{S}_X(t-T)$, $\hat{S}_Y(t-T)$, respectively. This delay is denoted by box 1002.

As denoted by box 1004, the preliminary digital drive signals $\hat{S}_X(t)$, $\hat{S}_Y(t)$, $\hat{S}_X(t-T)$, $\hat{S}_Y(t-T)$ are partitioned into pairs, such that signal $\hat{S}_X(t)$ is paired with the signal $\hat{S}_Y(t-T)$, while the signal $\hat{S}_Y(t)$ is paired with the signal $\hat{S}_X(t-T)$.

As denoted by box 1006, the preliminary digital drive signals $\hat{S}_X(t-T)$ and $\hat{S}_Y(t)$ undergo a 45-degree rotation, which results in the signals $S_X(t-T)$ and $S_Y(t)$, respectively.

As denoted by box 1008, the preliminary digital drive signals $\hat{S}_Y(t-T)$ and $\hat{S}_X(t)$ may also undergo a 45-degree rotation, which results in the signals $S_Y(t-T)$ and $S_X^*(t)$, respectively.

The signals $S_X(t-T)$ and $S_Y(t-T)$ are the transformed digital drive signals at the first timeslot, t–T. The signals $S_Y^*(t)$ and $S_X^*(t)$ may undergo a complex conjugate operation, denoted by box 1010, to generate the signals $S_X(t)$ and $S_Y(t)$, respectively, which are the transformed digital drive signals at the second timeslot, t.

Accordingly, the operations performed in FIG. 10 may be used to achieve the dimensional transformation 902 described with respect to FIG. 9, by transforming preliminary digital drive signals 901 at a specific timeslot, t (e.g., $\hat{S}_X(t)$, $\hat{S}_Y(t)$ as illustrated in FIG. 10) into transformed digital drive signals 903 at the same specific timeslot, t (e.g., $S_X(t)$, $S_Y(t)$ as illustrated in FIG. 10). The operations in FIG. 10 demonstrate merely one example of how the dimensional transformation 902 may be implemented.

Figure 11:
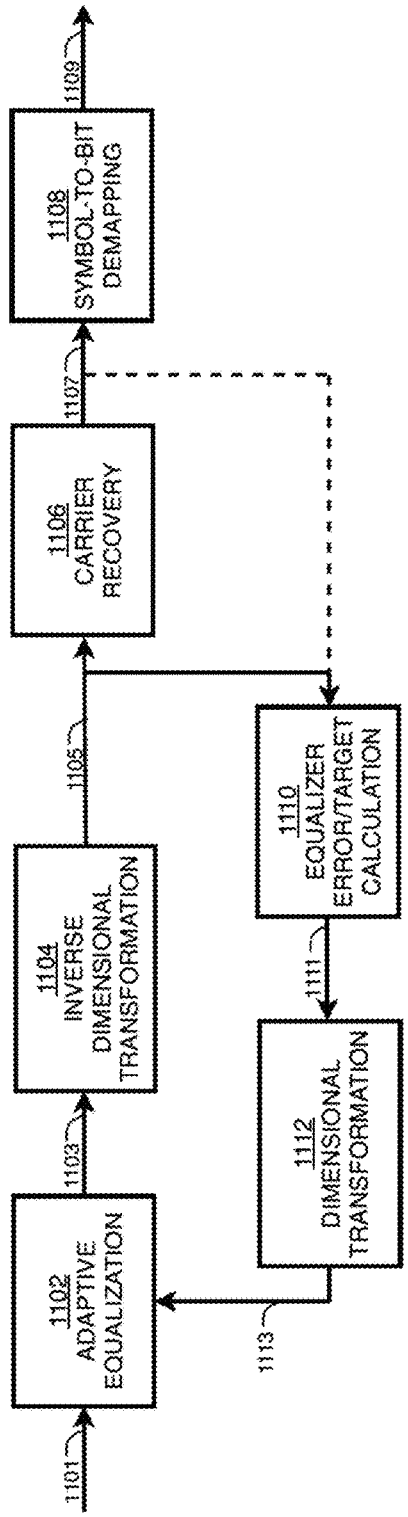
FIG. 11 is a schematic diagram illustrating the implementation of an inverse dimensional transformation at a receiver according to the first example.

FIG. 11 is a schematic diagram illustrating the implementation of an inverse dimensional transformation at a receiver according to the first example. In this example, the inverse dimensional transformation comprises an inverse matrix transformation $H_1^{-1}$ provided in Eq. 3:

$$H_1^{-1} \triangleq \begin{pmatrix} 1 & 0 & 0 & -1 \\ 0 & 1 & -1 & 0 \\ 0 & 1 & 1 & 0 \\ 1 & 0 & 0 & 1 \end{pmatrix} \quad (3)$$

Application of the inverse matrix transformation $H_1^{-1}$ at the receiver is included as part of inverse dimensional transformation 1108, which is the inverse of the dimensional transformation 902 that was applied at the transmitter. Received digital signals $R_X(t-T)$, $R_Y(t-T)$, $R_X(t)$, $R_Y(t)$ may undergo a partial complex conjugate operation to produce signals $R_X(t-T)$, $R_Y(t-T)$, $R_X^*(t)$, $R_Y^*(t)$, where t–T denotes a first integer timeslot, and t denotes a second integer timeslot. The inverse matrix transformation $H_1^{-1}$ may then be applied to the signals $R_X(t-T)$, $R_Y(t-T)$, $R_X^*(t)$, $R_Y^*(t)$ to generate signals $\hat{R}_X(t-T)$, $\hat{R}_Y(t-T)$, $\hat{R}_X(t)$, $\hat{R}_Y(t)$, respectively. This is shown in Eq. 4.

$$\begin{pmatrix} \hat{R}_X(t-T) \\ \hat{R}_Y(t-T) \\ \hat{R}_X(t) \\ \hat{R}_Y(t) \end{pmatrix} = H_1^{-1} \begin{pmatrix} R_X(t-T) \\ R_Y(t-T) \\ R_X^*(t) \\ R_Y^*(t) \end{pmatrix} = \begin{pmatrix} 1 & 0 & 0 & -1 \\ 0 & 1 & -1 & 0 \\ 0 & 1 & 1 & 0 \\ 1 & 0 & 0 & 1 \end{pmatrix} \begin{pmatrix} R_X(t-T) \\ R_Y(t-T) \\ R_X^*(t) \\ R_Y^*(t) \end{pmatrix} \quad (4)$$

The signals $\hat{R}_X(t-T)$ and $\hat{R}_Y(t-T)$ denote preliminary digital drive signal estimates at the first timeslot, t–T, while the signals $\hat{R}_X(t)$ and $\hat{R}_Y(t)$ denote preliminary digital drive signal estimates at the second timeslot, t. Referring to FIG. 11, the inverse dimensional transformation 1104 is applied to received digital signals 1103 to produce preliminary digital drive signal estimates 1105. The preliminary digital drive signal estimates 1105 may subsequently undergo carrier recovery 1106, to generate symbol estimates 1107, followed by symbol-to-bit demapping 1108, to generate bit estimates 1109.

Prior to undergoing the inverse dimensional transformation 1104, the received digital signals 1103 may have undergone additional processing. For example, the received digital signals 1103 may result from applying adaptive equalization 1102 to digital signals 1101, in order to compensate for channel linear impairments, such as PMD and PDL. The adaptive equalization 1102 may be implemented using a variety of algorithms, such as LMS, CMA, RLS, and DFE. The adaptive equalization 1102 may be applied in either the time domain or the frequency domain. In one example, a FFT may be applied to digital signals generated from analog-to-digital conversion, thereby producing frequency-domain signals, which may be processed using adaptive equalization in the frequency domain. The processed frequency-domain signals may then be converted to corresponding time-domain signals by an IFFT.

Parameters used for the adaptive equalization 1102 may be updated as channel linear distortions evolve over time. In some examples, the parameters may be updated based on error values determined from the difference between an ideal target signal and a received signal. In other examples, the parameters may be updated based on a calculation of the value of the target signal. In some examples, the preliminary digital drive signal estimates 1105 may undergo an equalizer error/target calculation 1110 to generate values 1111. In some examples, the calculation 1110 may involve a LUT. Dimensional transformation 1112, which is identical to the dimensional transformation 902, may be applied to the values 1111 to generate transformed values 1113, which are used to guide parameters used for the adaptive equalization 1102. As denoted by the dashed-line, in some examples, the equalizer error/target calculation 1110 may be applied to the symbol estimates 1107 generated by the carrier recovery 1106, instead of the preliminary digital drive signal estimates 1105 generated by the inverse dimensional transformation 1104.

Figure 12:
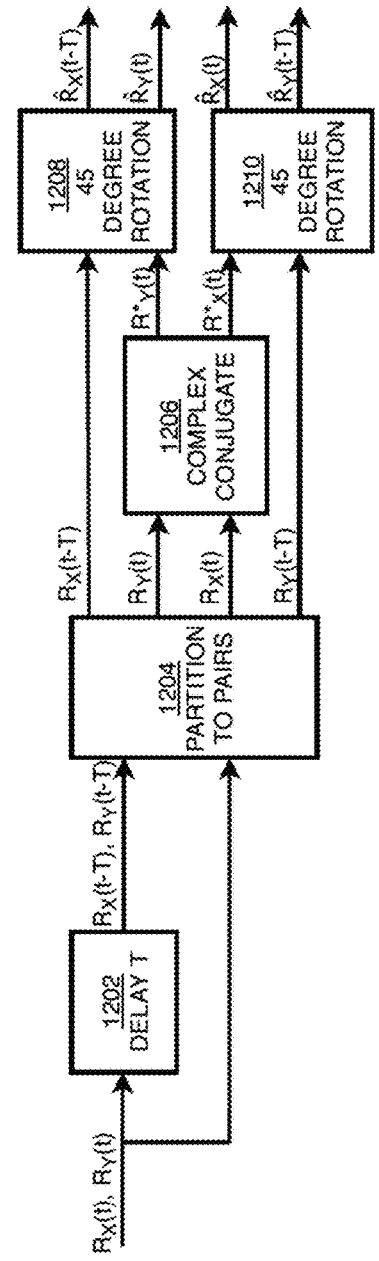
FIG. 12 is a schematic diagram illustrating example details for implementing the inverse dimensional according to the first example.

FIG. 12 is a schematic diagram illustrating example details for implementing the inverse dimensional according to the first example. That is, the inverse dimensional transformation 1104 described with respect to FIG. 11 may be implemented using the operations performed in FIG. 12.

Given received digital signals $R_X(t)$, $R_Y(t)$, application of a delay of T timeslots results in received digital signals $R_X(t-T)$, $R_Y(t-T)$, respectively. This delay is denoted by box 1202.

As denoted by box 1204, the received digital signals $R_X(t)$, $R_Y(t)$, $R_X(t-T)$, $R_Y(t-T)$ are partitioned into pairs, such that signal $R_X(t-T)$ is paired with the signal $R_Y(t)$, while the signal $R_X(t)$ is paired with the signal $R_Y(t-T)$.

The signals $R_X(t)$ and $R_Y(t)$ may undergo a complex conjugate operation, denoted by box 1206, to generate the signals $R_X^*(t)$ and $R_Y^*(t)$, respectively.

As denoted by box 1208, the signals $R_X(t-T)$ and $R_Y^*(t)$ may undergo a 45-degree rotation, which results in the signals $\hat{R}_X(t-T)$ and $\hat{R}_Y(t)$, respectively.

As denoted by box 1210, the signals $R_X^*(t)$ and $R_Y(t-T)$ may also undergo a 45-degree rotation, which results in the signals $\hat{R}_X(t)$ and $\hat{R}_Y(t-T)$, respectively.

The signals $\hat{R}_X(t-T)$ and $\hat{R}_Y(t-T)$ are the preliminary digital drive signal estimates at the first timeslot, t–T. The signals $\hat{R}_X(t)$ and $\hat{R}_Y(t)$ are the preliminary digital drive signal estimates at the second timeslot, t.

Accordingly, the operations performed in FIG. 12 may be used to achieve the inverse dimensional transformation 1104 described with respect to FIG. 11, by transforming received digital signals 1103 at a specific timeslot, t (e.g., $R_X(t)$, $R_Y(t)$ as illustrated in FIG. 12) into preliminary digital drive signal estimates 1105 at the same specific timeslot, t (e.g., $\hat{R}_X(t)$, $\hat{R}_Y(t)$ as illustrated in FIG. 12). The operations in FIG. 12 demonstrate merely one example of how the inverse dimensional transformation 1104 may be implemented.

It may be demonstrated computationally that the aggregate NSR of the preliminary digital drive signal estimates 1105 is identical to the aggregate NSR of the received digital signals 1103. That is, the inverse dimensional transformation 1104 does not alter the average NSR. Instead, the inverse dimensional transformation 1104 redistributes or averages the noise or other degradations across signal dimensions.

Example 2

According to a second example, a dimensional transformation comprises a matrix transformation $H_2$ provided in Eq. 5:

$$H_2 \triangleq \begin{pmatrix} 1 & 1 \\ -1 & 1 \end{pmatrix} \quad (5)$$

The matrix transformation $H_2$ may be applied to the preliminary digital drive signals $\hat{S}_X(t)$ and $\hat{S}_Y(t)$ to generate transformed digital drive signals $S_X(t-T)$ and $S_Y(t)$, respectively, where t–T denotes a first integer timeslot, and t denotes a second integer timeslot. This is shown in Eq. 6.

$$\begin{pmatrix} S_X(t-T) \\ S_Y(t) \end{pmatrix} = H_2 \begin{pmatrix} \hat{S}_X(t) \\ \hat{S}_Y(t) \end{pmatrix} = \begin{pmatrix} 1 & 1 \\ -1 & 1 \end{pmatrix} \begin{pmatrix} \hat{S}_X(t) \\ \hat{S}_Y(t) \end{pmatrix} \quad (6)$$

The signal $S_X(t-T)$ denotes the transformed digital drive signal in the X polarization at the first timeslot, t–T, while the signal $S_Y(t)$ denotes the transformed digital drive signal in the Y polarization at the second timeslot, t.

Figure 13:
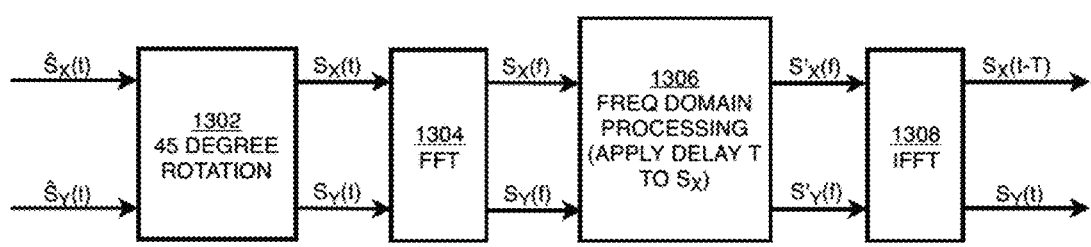
FIG. 13 is a schematic diagram illustrating the implementation of a dimensional transformation at a transmitter according to a second example.

FIG. 13 is a schematic diagram illustrating example details for implementing a dimensional transformation at a transmitter according to the second example.

As denoted by box 1302, the preliminary digital drive signals $\hat{S}_X(t)$ and $\hat{S}_Y(t)$ undergo a 45-degree rotation, which results in the signals $S_X(t)$ and $S_Y(t)$, respectively.

As denoted by box 1304, a FFT is applied to the signals $S_X(t)$ and $S_Y(t)$, thereby producing frequency-domain signals $S_X(f)$ and $S_Y(f)$, respectively.

As denoted by box 1306, the signals $S_X(f)$ and $S_Y(f)$ may undergo frequency-domain processing to produce signals $S'_X(f)$ and $S'_Y(f)$, respectively. The processing 1306 may include the application of a delay of T timeslots to signal $S_X$ relative to the signal $S_Y$.

The processed frequency-domain signals $S'_X(f)$ and $S'_Y(f)$ may be converted by an IFFT 1308 to corresponding time-domain signals, denoted $S_X(t-T)$ and $S_Y(t)$, respectively.

Accordingly, the operations performed in FIG. 13 may be used to achieve the dimensional transformation denoted by Eq. 6, by transforming preliminary digital drive signals y(t) into transformed digital drive signals $S_X(t-T)$, $S_Y(t)$. The operations in FIG. 13 demonstrate merely one example of how the dimensional transformation denoted by Eq. 6 may be implemented.

According to the second example, the inverse dimensional transformation comprises an inverse matrix transformation $H_2^{-1}$ provided in Eq. 7:

$$H_2^{-1} \triangleq \begin{pmatrix} 1 & -1 \\ 1 & 1 \end{pmatrix} \quad (7)$$

The inverse matrix transformation $H_2^{-1}$ may be applied to received digital signals $R_X(t)$ and $R_Y(t-T)$ to generate preliminary digital drive signal estimates $\hat{R}_X(t)$ and $\hat{R}_Y(t)$, respectively, where t denotes a first integer timeslot, and t–T denotes a second integer timeslot. This is shown in Eq. 8.

$$\begin{pmatrix} \hat{R}_X(t) \\ \hat{R}_Y(t) \end{pmatrix} = H_2^{-1} \begin{pmatrix} R_X(t-T) \\ R_Y(t) \end{pmatrix} = \begin{pmatrix} 1 & -1 \\ 1 & 1 \end{pmatrix} \begin{pmatrix} R_X(t-T) \\ R_Y(t) \end{pmatrix} \quad (8)$$

Figure 14:
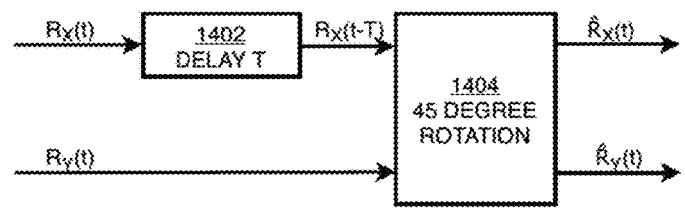
FIG. 14 is a schematic diagram illustrating the implementation of an inverse dimensional transformation at a receiver according to the second example.

FIG. 14 is a schematic diagram illustrating the implementation of an inverse dimensional transformation at a receiver according to the second example.

Given received digital signals $R_X(t)$ and $R_Y(t)$ at a second timeslot, t, such as the signals 1107 described with respect to FIG. 11, a delay of T timeslots may be applied to the received digital signal $R_X(t)$, thereby producing $R_X(t-T)$ at a first timeslot t−T. This delay is denoted by box 1402.

As denoted by box 1404, the signals $R_X(t-T)$ and $R_Y(t)$ may undergo a 45-degree rotation, which results in the signals $\hat{R}_X(t)$ and $\hat{R}_Y(t)$, respectively. The signals $\hat{R}_X(t)$ and $\hat{R}_Y(t)$ are the preliminary digital drive signal estimates at the second timeslot, t.

Accordingly, the operations performed in FIG. 14 may be used to achieve the inverse dimensional transformation denoted by Eq. 8, by transforming received digital signals $R_X(t-T), R_Y(t)$ into preliminary digital drive signal estimates $\hat{R}_X(t), \hat{R}_Y(t)$, respectively. The operations in FIG. 14 may be implemented in place of the inverse dimensional transformation 1108 in FIG. 11. In this case, the operations illustrated in FIG. 13 would be implemented in place of the dimensional transformation 902 in FIG. 9.

The dimensional transformation of Example 2 (see Eq. 6 and FIG. 13) is a linear time-invariant operation. Accordingly, it may be inverted using an adaptive equalizer circuit, which may be implemented, for example, in the receive DSP 314 as part of the channel impairment compensation. Indeed, the dimensional transformation of Example 2 may be thought of as an example of a time-invariant linear transformation such as the one applied by the channel itself, but which is intentionally applied at the transmitter. Thus, the adaptive equalization performed at the receiver may be able to invert the dimensional transformation together with channel linear impairments. In contrast, the dimensional transformation of Example 1 (see Eq. 2 and FIG. 10) is a time-variant transformation, since it involves partitioning time samples into pairs. Accordingly, a channel equalizer at the receiver may not be capable of inverting such an operation.

As a result of an I/Q power imbalance or timing skew, the noise power may differ between dimensions XI, XQ, YI, and YQ at a given timeslot. Examples 3 and 4 below describe modified versions of the matrix transformations $H_1$ and $H_2$, respectively, that may average out impairments which affect the I and Q components of the X and Y polarizations differently.

Example 3

According to a third example, a dimensional transformation comprising a modified version of the matrix transformation $H_1$ of the first example may be implemented at a transmitter. In this third example, the matrix transformation, denoted $H_3$, is provided by Eq. 9:

$$H_3 \triangleq e^{\frac{j\pi}{4}} \begin{pmatrix} 1 & 0 & 0 & 1j \\ 0 & 1 & 1j & 0 \\ 0 & 1j & 1 & 0 \\ 1j & 0 & 0 & 1 \end{pmatrix} \quad (9)$$

The matrix transformation $H_3$ may be used in place of the matrix transformation $H_1$ in Eq. 2, thereby resulting in Eq. 10:

$$\begin{pmatrix} S_X(t-T) \\ S_Y(t-T) \\ S_X^*(t) \\ S_Y^*(t) \end{pmatrix} = H_3 \begin{pmatrix} \hat{S}_X(t-T) \\ \hat{S}_Y(t-T) \\ \hat{S}_X(t) \\ \hat{S}_Y(t) \end{pmatrix} = e^{\frac{j\pi}{4}} \begin{pmatrix} 1 & 0 & 0 & 1j \\ 0 & 1 & 1j & 0 \\ 0 & 1j & 1 & 0 \\ 1j & 0 & 0 & 1 \end{pmatrix} \begin{pmatrix} \hat{S}_X(t-T) \\ \hat{S}_Y(t-T) \\ \hat{S}_X(t) \\ \hat{S}_Y(t) \end{pmatrix} \quad (10)$$

As described with respect to Eq. 2, the signals $S_X(t-T)$ and $S_Y(t-T)$ denote the transformed digital drive signals at the first timeslot, t−T. The transformed digital drive signals at the second timeslot, t, that is $S_X(t)$ and $S_Y(t)$, may be determined by taking the complex conjugate of the signals $S_X^*(t)$ and $S_Y^*(t)$, respectively.

According to the third example, the inverse dimensional transformation comprises an inverse matrix transformation $H_3^{-1}$ that is provided in Eq. 11:

$$H_3^{-1} \triangleq e^{-\frac{j\pi}{4}} \begin{pmatrix} 1 & 0 & 0 & -1j \\ 0 & 1 & -1j & 0 \\ 0 & -1j & 1 & 0 \\ -1j & 0 & 0 & 1 \end{pmatrix} \quad (11)$$

The inverse matrix transformation $H_3^{-1}$ may be used in place of the inverse matrix transformation $H_1^{-1}$ in Eq. 4, thereby resulting in Eq. 12:

$$\begin{pmatrix} \hat{R}_X(t-T) \\ \hat{R}_Y(t-T) \\ \hat{R}_X(t) \\ \hat{R}_Y(t) \end{pmatrix} = \quad (12)$$

$$H_3^{-1} \begin{pmatrix} R_X(t-T) \\ R_Y(t-T) \\ R_X^*(t) \\ R_Y^*(t) \end{pmatrix} = e^{-\frac{j\pi}{4}} \begin{pmatrix} 1 & 0 & 0 & -1j \\ 0 & 1 & -1j & 0 \\ 0 & -1j & 1 & 0 \\ -1j & 0 & 0 & 1 \end{pmatrix} \begin{pmatrix} R_X(t-T) \\ R_Y(t-T) \\ R_X^*(t) \\ R_Y^*(t) \end{pmatrix}$$

As described with respect to Eq. 4, the signals $\hat{R}_X(t-T)$ and $\hat{R}_Y(t-T)$ denote preliminary digital drive signal estimates at the first timeslot, t−T, while the signals $\hat{R}_X(t)$ and $\hat{R}_Y(t)$ denote preliminary digital drive signal estimates at the second timeslot, t.

Given an impairment at the transmitter which affects the I and Q components of the X and Y polarizations differently, it may be shown that implementation of a dimensional transformation comprising the matrix transformation $H_3$ may average the impairment across the dimensions.

Example 4

According to a fourth example, a dimensional transformation comprising a modified version of the matrix transformation $H_2$ of the second example may be implemented at a transmitter. In this fourth example, the matrix transformation, denoted $H_4$, is provided by Eq. 13:

$$H_4 \triangleq e^{\frac{j\pi}{4}} \begin{pmatrix} 1 & 1j \\ 1j & 1 \end{pmatrix} \quad (13)$$

The matrix transformation $H_4$ may be used in place of the matrix transformation $H_2$ in Eq. 6, thereby resulting in Eq. 14:

$$\begin{pmatrix} S_X(t-T) \\ S_Y(t) \end{pmatrix} = H_4 \begin{pmatrix} \hat{S}_X(t) \\ \hat{S}_Y(t) \end{pmatrix} = e^{\frac{j\pi}{4}} \begin{pmatrix} 1 & 1j \\ 1j & 1 \end{pmatrix} \begin{pmatrix} \hat{S}_X(t) \\ \hat{S}_Y(t) \end{pmatrix} \quad (14)$$

As described with respect to Eq. 6, the signal $S_X(t-T)$ denotes the transformed digital drive signal in the X polarization at the first timeslot, $t-T$, while the signal $S_Y(t)$ denotes the transformed digital drive signal in the Y polarization at the second timeslot, t.

According to the fourth example, the inverse dimensional transformation comprises an inverse matrix transformation $H_4^{-1}$ that is provided in Eq. 15:

$$H_4^{-1} \triangleq e^{-\frac{j\pi}{4}} \begin{pmatrix} 1 & -1j \\ -1j & 1 \end{pmatrix} \quad (15)$$

The inverse matrix transformation $H_4^{-1}$ may be used in place of the inverse matrix transformation $H_2^{-1}$ in Eq. 8, thereby resulting in Eq. 16:

$$\begin{pmatrix} \hat{R}_X(t) \\ \hat{R}_Y(t) \end{pmatrix} = H_4^{-1} \begin{pmatrix} R_X(t-T) \\ R_Y(t) \end{pmatrix} = e^{-\frac{j\pi}{4}} \begin{pmatrix} 1 & -1j \\ -1j & 1 \end{pmatrix} \begin{pmatrix} R_X(t-T) \\ R_Y(t) \end{pmatrix} \quad (16)$$

As described with respect to Eq. 8, the signals $\hat{R}_X(t)$ and $\hat{R}_Y(t)$ denote preliminary digital drive signal estimates at a first timeslot, t, which are dependent on the received digital signals $R_X(t-T)$ and $R_Y(t)$ at the first timeslot, $t-T$, and a second timeslot, t, respectively.

Given an impairment at the transmitter which affects the I and Q components of the X and Y polarizations differently, it may be shown that implementation of a dimensional transformation comprising the matrix transformation $H_4$ may average the impairment across the dimensions.

Example 5

According to a fifth example, a dimensional transformation may comprise the application of a 4×4 Hadamard matrix to the four-dimensional signal $\hat{S}_X(t)$, $\hat{S}_Y(t)$, followed by interleaving different dimensions, for example, $\hat{S}_{XI}(t)$, $\hat{SX}_{XQ}(t)$, $\hat{S}_{YI}(t)$, $\hat{S}_{YQ}(t)$. At a transmitter, a 4×4 real matrix multiplied with a matrix such as a Hadamard matrix may be applied, which would differ from the 2×2 complex matrix referred to in Eq. 6. The interleaving of different dimensions may be achieved using an additional matrix which is also substantially linear, and substantially unitary. As a result of these two matrix transformations, the preliminary digital drive signals may be converted into transformed digital drive signals.

At a receiver, de-interleaving may be applied to received digital signals by applying the inverse of the interleaving matrix, followed by the application of the inverse real Hadamard matrix transformation, such as the inverse matrix transformation $H_2^{-1}$ provided in Eq. 7. As a result of these two inverse matrix transformations, together referred to as the inverse dimensional transformation, the received digital signals may be converted into preliminary digital drive signal estimates. This inverse dimensional transformation may have an advantageous effect on the distribution of nonlinear noise in the preliminary digital drive signal estimates.

Figure 15:
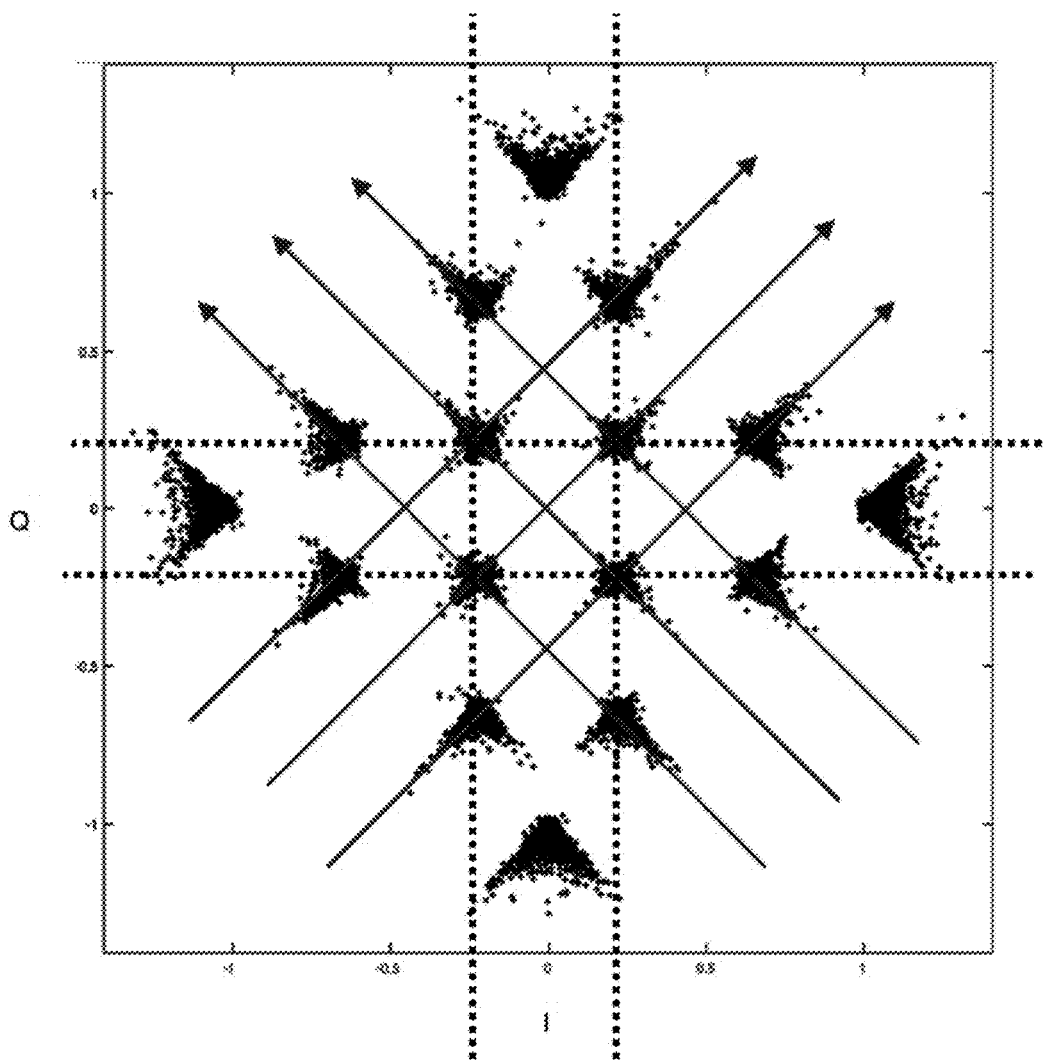
FIG. 15 is a histogram of received values which have undergone an inverse dimensional transformation according to a fifth example.

FIG. 15 is a histogram of received values which have undergone an inverse dimensional transformation incorporating de-interleaving of dimensions and application of the inverse of the real 4×4 Hadamard matrix as described with respect to Example 5. The received values are based on multi-bit symbols having been generated at a transmitter based on a dual-polarization (DP)-16QAM modulation scheme, the symbols having undergone a dimensional transformation at the transmitter.

Each of the horizontal and vertical axes shows a specific dimension in time such as $\hat{R}_{XI}(t)$, $\hat{R}_{XQ}(t)$, $\hat{R}_{YI}(t)$, $\hat{R}_{YQ}(t)$. The received histogram includes a population of clouds of received symbols with centers at the ideal transmitted symbols. The difference between the received points and the closest ideal DP-16QAM point determines the channel noise. The dotted horizontal and vertical lines represent the directions in which the square of the minimum Euclidean distance is equal to one, that is $d^2_{min}=1$. The solid diagonal arrows represent the direction in which $d^2_{min}=2$. The plot of FIG. 15 demonstrates that applying the inverse dimensional transformation distributed the nonlinear noise more along the diagonal lines, and less along the vertical and horizontal lines. By causing the nonlinear noise to be distributed in this manner, the likelihood of detecting the wrong symbol during carrier recovery may be reduced, which may ultimately lead to lower BERs.

In the preceding examples, soft FEC decoding, such as ML decoding, may be used to recover corrected client data bits. Soft decoding may be performed over multiple dimensions. By increasing the dimensionality over which soft decoding is performed, it may be possible to improve performance by exploiting correlations, and by using higher dimensional geometry in the constellation design. However, this improvement may be at the expense of increased circuit complexity.

In the preceding examples, the delay T is described as being an integer number of timeslots. More generally, however, the delay T that is included as part of a dimensional transformation or an inverse dimensional transformation may be a non-integer or fractional number.

The scope of the claims should not be limited by the details set forth in the examples, but should be given the broadest interpretation consistent with the description as a whole.

What is claimed is:

1. A method performed at an optical receiver comprising a polarizing beam splitter, an optical hybrid, photodetectors, analog-to-digital converters, and a processor, the method comprising:
   receiving an optical signal over an optical communications channel established between the optical receiver and an optical transmitter, wherein the received optical signal comprises a degraded version of a modulated optical signal generated at the optical transmitter;
   the polarizing beam splitter splitting the received optical signal into polarized components;
   the optical hybrid processing the polarized components to generate processed components;
   the photodetectors converting the processed components into received analog signals;
   the analog-to-digital converters converting the received analog signals into received digital signals corresponding to a plurality of first dimensions of the received optical signal, wherein the first dimensions correspond to dimensions of an optical carrier modulated at the optical transmitter to represent a multi-bit symbol, and wherein the first dimensions are distributed over two or more timeslots;

the processor applying an inverse dimensional transformation to the received digital signals to generate preliminary digital drive signal estimates corresponding to a plurality of second dimensions; and the processor processing the preliminary digital drive signal estimates to generate an estimate of the multi-bit symbol.

2. The method as claimed in claim 1, wherein the plurality of second dimensions is less than the plurality of first dimensions.

3. The method as claimed in claim 1, wherein the two or more timeslots are non-consecutive.

4. The method as claimed in claim 1, wherein the first dimensions are distributed over two polarizations.

5. The method as claimed in claim 1, wherein the first dimensions are distributed over in-phase (I) and quadrature (Q) components of at least one polarization.

6. The method as claimed in claim 1, wherein the inverse dimensional transformation averages signal degradations in the received digital signals, the signal degradations caused by one or more of noise, nonlinear effects, polarization dependent loss or gain (PDL), and analog imperfections.

7. The method as claimed in claim 1, wherein the inverse dimensional transformation comprises a matrix, and wherein the matrix is substantially linear and substantially unitary.

8. The method as claimed in claim 1, wherein the first dimensions of the optical carrier are modulated at the optical transmitter based on transformed digital drive signals, the transformed digital drive signals having been determined at the optical transmitter using a dimensional transformation and preliminary digital drive signals.

9. The method as claimed in claim 8, wherein the dimensional transformation comprises a first matrix, wherein the inverse dimensional transformation comprises a second matrix, wherein the first and second matrices are substantially linear and substantially unitary, and wherein the second matrix is substantially the inverse of the first matrix.

10. The method as claimed in claim 1, the method comprising processing the received optical signal using an adaptive equalization circuit to compensate for linear impairments in the optical communications channel.

11. An optical receiver configured to receive an optical signal over an optical communications channel established between the optical receiver and an optical transmitter, wherein the received optical signal comprises a degraded version of a modulated optical signal generated at the optical transmitter, the optical receiver comprising:

a polarizing beam splitter configured to split the received optical signal into polarized components;

an optical hybrid configured to process the polarized components to generate processed components;

photodetectors configured to convert the processed components into received analog signals;

analog-to-digital converters configured to convert the received analog signals into received digital signals corresponding to a plurality of first dimensions of the received optical signal, wherein the first dimensions correspond to dimensions of an optical carrier modulated at the optical transmitter to represent a multi-bit symbol, and wherein the first dimensions are distributed over two or more timeslots;

a processor; and a memory storing computer-executable instructions which, when executed by the processor, cause the processor to apply an inverse dimensional transformation to the received digital signals to generate preliminary digital drive signal estimates corresponding to a plurality of second dimensions, and to process the preliminary digital drive signal estimate to generate an estimate of the multi-bit symbol.

12. The optical receiver as claimed in claim 11, wherein the plurality of second dimensions is less than the plurality of first dimensions.

13. The optical receiver as claimed in claim 11, wherein the two or more timeslots are non-consecutive.

14. The optical receiver as claimed in claim 11, wherein the first dimensions are distributed over two polarizations.

15. The optical receiver as claimed in claim 11, wherein the first dimensions are distributed over in-phase (I) and quadrature (Q) components of at least one polarization.

16. The optical receiver as claimed in claim 11, wherein the inverse dimensional transformation averages signal degradations in the received digital signals, the signal degradations caused by one or more of noise, nonlinear effects, polarization dependent loss or gain (PDL), and analog imperfections.

17. The optical receiver as claimed in claim 11, wherein the inverse dimensional transformation comprises a matrix, and wherein the matrix is substantially linear and substantially unitary.

18. The optical receiver as claimed in claim 11, wherein the first dimensions of the optical carrier are modulated at the optical transmitter based on transformed digital drive signals, the transformed digital drive signals having been determined at the optical transmitter using a dimensional transformation and preliminary digital drive signals.

19. The optical receiver as claimed in claim 18, wherein the dimensional transformation comprises a first matrix, wherein the inverse dimensional transformation comprises a second matrix, wherein the first and second matrices are substantially linear and substantially unitary, and wherein the second matrix is substantially the inverse of the first matrix.

20. The optical receiver as claimed in claim 11, wherein execution of the computer-executable instructions cause the optical receiver to process the received optical signal using an adaptive equalization circuit to compensate for linear impairments in the optical communications channel.

* * * * *